US005948049A

United States Patent [19]

Miyanishi

[11] Patent Number: 5,948,049

[45] Date of Patent: Sep. 7, 1999

[54] NORMALIZATION CIRCUITRY

[75] Inventor: Atsushi Miyanishi, Tokyo, Japan

[73] Assignee: Mitsubishi Denki Kabushiki Kaisha, Tokyo, Japan

[21] Appl. No.: 08/986,300

[22] Filed: Dec. 5, 1997

[30] Foreign Application Priority Data

Jul. 14, 1997 [JP] Japan .................................... 9-188800

[51] Int. Cl.[6] ........................................ G06F 5/01

[52] U.S. Cl. ........................................ 708/205

[58] Field of Search ........................................ 708/205, 495

[56] References Cited

U.S. PATENT DOCUMENTS

| | | | |
|---|---|---|---|
| 5,187,678 | 2/1993 | Hori | 708/205 |
| 5,699,285 | 12/1997 | Miyanishi et al. | 708/205 |
| 5,757,682 | 5/1998 | Schwarz et al. | 708/205 |
| 5,764,549 | 6/1998 | Bjorksten et al. | 708/205 |
| 5,796,644 | 8/1998 | Jiang | 708/205 |

*Primary Examiner*—David H. Malzahn
*Attorney, Agent, or Firm*—Burns, Doane, Swecker & Mathis, LLP

[57] ABSTRACT

Normalization circuitry comprises an AND gate for computing the AND of a reference signal generated from an exponent input with a mantissa input, and an OR gate for computing the OR of all the bits of the output of the AND gate. A leading one detector detects the bit position of the leading 1 of the mantissa input, and then generates a signal only one bit at the detected bit position of which is set to 1. A priority encoder then subtracts 1 from the number showing the bit position of the leading 1 counted from the most significant bit (MSB). A one-bit shifter shifts all the bits of the signal except its MSB from the leading one detector one bit position to the right. The normalization circuitry further includes a first selecting circuit for furnishing the output of the one-bit shifter as all the bits of a control signal except its MSB when the output of the OR gate is logic 1, and for furnishing an output of a decoder which decodes the exponent input as all the bits of the control signal except its MSB when the output of the OR gate is logic 0, a shifter for shifting the mantissa input by the shift amount represented by the control signal comprised of the most significant bit of the signal from the leading one detector and all the bits of the output of the first selecting circuit so as to generate a mantissa output, and a second selecting circuit for furnishing a subtraction result obtained by subtracting a binary number from the priority encoder from the exponent input as an exponent output when the output of the OR gate is logic 1, and for furnishing a zero binary number as the exponent output when the output of the OR gate is logic 0.

20 Claims, 25 Drawing Sheets

FIG.2

| OUTPUT SIGNAL (A') | | | | | | | | | | | | | | | | | | | | | | | | INPUT VALUE(A) (X...X) SHOWS BINARY VALUE |
|---|---|---|---|---|---|---|---|---|---|---|---|---|---|---|---|---|---|---|---|---|---|---|---|---|
| $A'_{23}$ | $A'_{22}$ | $A'_{21}$ | $A'_{20}$ | $A'_{19}$ | $A'_{18}$ | $A'_{17}$ | $A'_{16}$ | $A'_{15}$ | $A'_{14}$ | $A'_{13}$ | $A'_{12}$ | $A'_{11}$ | $A'_{10}$ | $A'_{9}$ | $A'_{8}$ | $A'_{7}$ | $A'_{6}$ | $A'_{5}$ | $A'_{4}$ | $A'_{3}$ | $A'_{2}$ | $A'_{1}$ | $A'_{0}$ | |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0(00000000) |
| 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1(00000001) |
| 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 2(00000010) |
| 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 3(00000011) |
| 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 4(00000100) |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 5(00000101) |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 6(00000110) |
| 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 7(00000111) |
| 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 8(00001000) |
| 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 9(00001001) |
| 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 10(00001010) |
| 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 11(00001011) |
| 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 12(00001100) |
| 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 13(00001101) |
| 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 14(00001110) |
| 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 15(00001111) |
| 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 16(00010000) |
| 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 17(00010001) |
| 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 18(00010010) |
| 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 19(00010011) |
| 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 20(00010100) |
| 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 21(00010101) |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 22(00010110) |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 23(00010111) |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | VALUE OTHER THAN THE ABOVE |

FIG.4

| OUTPUT SIGNAL (B") | | | | | | | | | | | | | | | | | | | | | | | | INPUT SIGNAL (B) | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| B"24 | B"23 | B"22 | B"21 | B"20 | B"19 | B"18 | B"17 | B"16 | B"15 | B"14 | B"13 | B"12 | B"11 | B"10 | B"9 | B"8 | B"7 | B"6 | B"5 | B"4 | B"3 | B"2 | B"1 | B23 | B22 | B21 | B20 | B19 | B18 | B17 | B16 | B15 | B14 | B13 | B12 | B11 | B10 | B9 | B8 | B7 | B6 | B5 | B4 | B3 | B2 | B1 |
| 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X | X | X | X | X | X | X | X | X | X |
| 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X | X | X | X | X | X | X | X | X |
| 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X | X | X | X | X | X | X | X |
| 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X | X | X | X | X | X | X |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X | X | X | X | X | X |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X | X | X | X | X |
| 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X | X | X | X |
| 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X | X | X |
| 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X | X |
| 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X | X |
| 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X | X |
| 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X | X |
| 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X | X |
| 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X | X |
| 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X | X |
| 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X | X |
| 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X | X |
| 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X | X |
| 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X | X |
| 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X |
| 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

NOTE : EACH X REPRESENTS A "DON'T CARE" STATE

FIG.6

| OUTPUT VALUE(B') (X...X)SHOWS BINARY VALUE | INPUT SIGNAL (B) | | | | | | | | | | | | | | | | | | | | | | |
|---|---|---|---|---|---|---|---|---|---|---|---|---|---|---|---|---|---|---|---|---|---|---|---|
| | $B_{23}$ | $B_{22}$ | $B_{21}$ | $B_{20}$ | $B_{19}$ | $B_{18}$ | $B_{17}$ | $B_{16}$ | $B_{15}$ | $B_{14}$ | $B_{13}$ | $B_{12}$ | $B_{11}$ | $B_{10}$ | $B_9$ | $B_8$ | $B_7$ | $B_6$ | $B_5$ | $B_4$ | $B_3$ | $B_2$ | $B_1$ | $B_0$ |
| 0(00000) | 1 | X | X | X | X | X | X | X | X | X | X | X | X | X | X | X | X | X | X | X | X | X | X | X |
| 1(00001) | 0 | 1 | X | X | X | X | X | X | X | X | X | X | X | X | X | X | X | X | X | X | X | X | X | X |
| 2(00010) | 0 | 0 | 1 | X | X | X | X | X | X | X | X | X | X | X | X | X | X | X | X | X | X | X | X | X |
| 3(00011) | 0 | 0 | 0 | 1 | X | X | X | X | X | X | X | X | X | X | X | X | X | X | X | X | X | X | X | X |
| 4(00100) | 0 | 0 | 0 | 0 | 1 | X | X | X | X | X | X | X | X | X | X | X | X | X | X | X | X | X | X | X |
| 5(00101) | 0 | 0 | 0 | 0 | 0 | 1 | X | X | X | X | X | X | X | X | X | X | X | X | X | X | X | X | X | X |
| 6(00110) | 0 | 0 | 0 | 0 | 0 | 0 | 1 | X | X | X | X | X | X | X | X | X | X | X | X | X | X | X | X | X |
| 7(00111) | 0 | 0 | 0 | 0 | 0 | 0 | 0 | 1 | X | X | X | X | X | X | X | X | X | X | X | X | X | X | X | X |
| 8(01000) | 0 | 0 | 0 | 0 | 0 | 0 | 0 | 0 | 1 | X | X | X | X | X | X | X | X | X | X | X | X | X | X | X |
| 9(01001) | 0 | 0 | 0 | 0 | 0 | 0 | 0 | 0 | 0 | 1 | X | X | X | X | X | X | X | X | X | X | X | X | X | X |
| 10(01010) | 0 | 0 | 0 | 0 | 0 | 0 | 0 | 0 | 0 | 0 | 1 | X | X | X | X | X | X | X | X | X | X | X | X | X |
| 11(01011) | 0 | 0 | 0 | 0 | 0 | 0 | 0 | 0 | 0 | 0 | 0 | 1 | X | X | X | X | X | X | X | X | X | X | X | X |
| 12(01100) | 0 | 0 | 0 | 0 | 0 | 0 | 0 | 0 | 0 | 0 | 0 | 0 | 1 | X | X | X | X | X | X | X | X | X | X | X |
| 13(01101) | 0 | 0 | 0 | 0 | 0 | 0 | 0 | 0 | 0 | 0 | 0 | 0 | 0 | 1 | X | X | X | X | X | X | X | X | X | X |
| 14(01110) | 0 | 0 | 0 | 0 | 0 | 0 | 0 | 0 | 0 | 0 | 0 | 0 | 0 | 0 | 1 | X | X | X | X | X | X | X | X | X |
| 15(01111) | 0 | 0 | 0 | 0 | 0 | 0 | 0 | 0 | 0 | 0 | 0 | 0 | 0 | 0 | 0 | 1 | X | X | X | X | X | X | X | X |
| 16(10000) | 0 | 0 | 0 | 0 | 0 | 0 | 0 | 0 | 0 | 0 | 0 | 0 | 0 | 0 | 0 | 0 | 1 | X | X | X | X | X | X | X |
| 17(10001) | 0 | 0 | 0 | 0 | 0 | 0 | 0 | 0 | 0 | 0 | 0 | 0 | 0 | 0 | 0 | 0 | 0 | 1 | X | X | X | X | X | X |
| 18(10010) | 0 | 0 | 0 | 0 | 0 | 0 | 0 | 0 | 0 | 0 | 0 | 0 | 0 | 0 | 0 | 0 | 0 | 0 | 1 | X | X | X | X | X |
| 19(10011) | 0 | 0 | 0 | 0 | 0 | 0 | 0 | 0 | 0 | 0 | 0 | 0 | 0 | 0 | 0 | 0 | 0 | 0 | 0 | 1 | X | X | X | X |
| 20(10100) | 0 | 0 | 0 | 0 | 0 | 0 | 0 | 0 | 0 | 0 | 0 | 0 | 0 | 0 | 0 | 0 | 0 | 0 | 0 | 0 | 1 | X | X | X |
| 21(10101) | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X | X |
| 22(10110) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | X |
| 23(10111) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 0(00000) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

NOTE : EACH X REPRESENTS A "DON'T CARE" STATE

FIG.7

| OUTPUT SIGNAL (A") | | | | | | | | | | | | | | | | | | | | | | | | INPUT SIGNAL (A) | | | | | | | | |
|---|---|---|---|---|---|---|---|---|---|---|---|---|---|---|---|---|---|---|---|---|---|---|---|---|---|---|---|---|---|---|---|---|
| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 1 |
| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 | 0 | 0 | 0 | 0 | 0 | 0 | 1 | 0 |
| 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 3 | 0 | 0 | 0 | 0 | 0 | 0 | 1 | 1 |
| 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 4 | 0 | 0 | 0 | 0 | 0 | 1 | 0 | 0 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 5 | 0 | 0 | 0 | 0 | 0 | 1 | 0 | 1 |
| 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 6 | 0 | 0 | 0 | 0 | 0 | 1 | 1 | 0 |
| 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 7 | 0 | 0 | 0 | 0 | 0 | 1 | 1 | 1 |
| 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 8 | 0 | 0 | 0 | 0 | 1 | 0 | 0 | 0 |
| 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 9 | 0 | 0 | 0 | 0 | 1 | 0 | 0 | 1 |
| 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 10 | 0 | 0 | 0 | 0 | 1 | 0 | 1 | 0 |
| 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 11 | 0 | 0 | 0 | 0 | 1 | 0 | 1 | 1 |
| 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 12 | 0 | 0 | 0 | 0 | 1 | 1 | 0 | 0 |
| 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 13 | 0 | 0 | 0 | 0 | 1 | 1 | 0 | 1 |
| 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 14 | 0 | 0 | 0 | 0 | 1 | 1 | 1 | 0 |
| 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 15 | 0 | 0 | 0 | 0 | 1 | 1 | 1 | 1 |
| 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 16 | 0 | 0 | 0 | 1 | 0 | 0 | 0 | 0 |
| 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 17 | 0 | 0 | 0 | 1 | 0 | 0 | 0 | 1 |
| 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 18 | 0 | 0 | 0 | 1 | 0 | 0 | 1 | 0 |
| 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 19 | 0 | 0 | 0 | 1 | 0 | 0 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 20 | 0 | 0 | 0 | 1 | 0 | 1 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 21 | 0 | 0 | 0 | 1 | 0 | 1 | 0 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 22 | 0 | 0 | 0 | 1 | 0 | 1 | 1 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 23 | 0 | 0 | 0 | 1 | 0 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | VALUE OTHER THAN THE ABOVE | | | | | | | | |

FIG.9

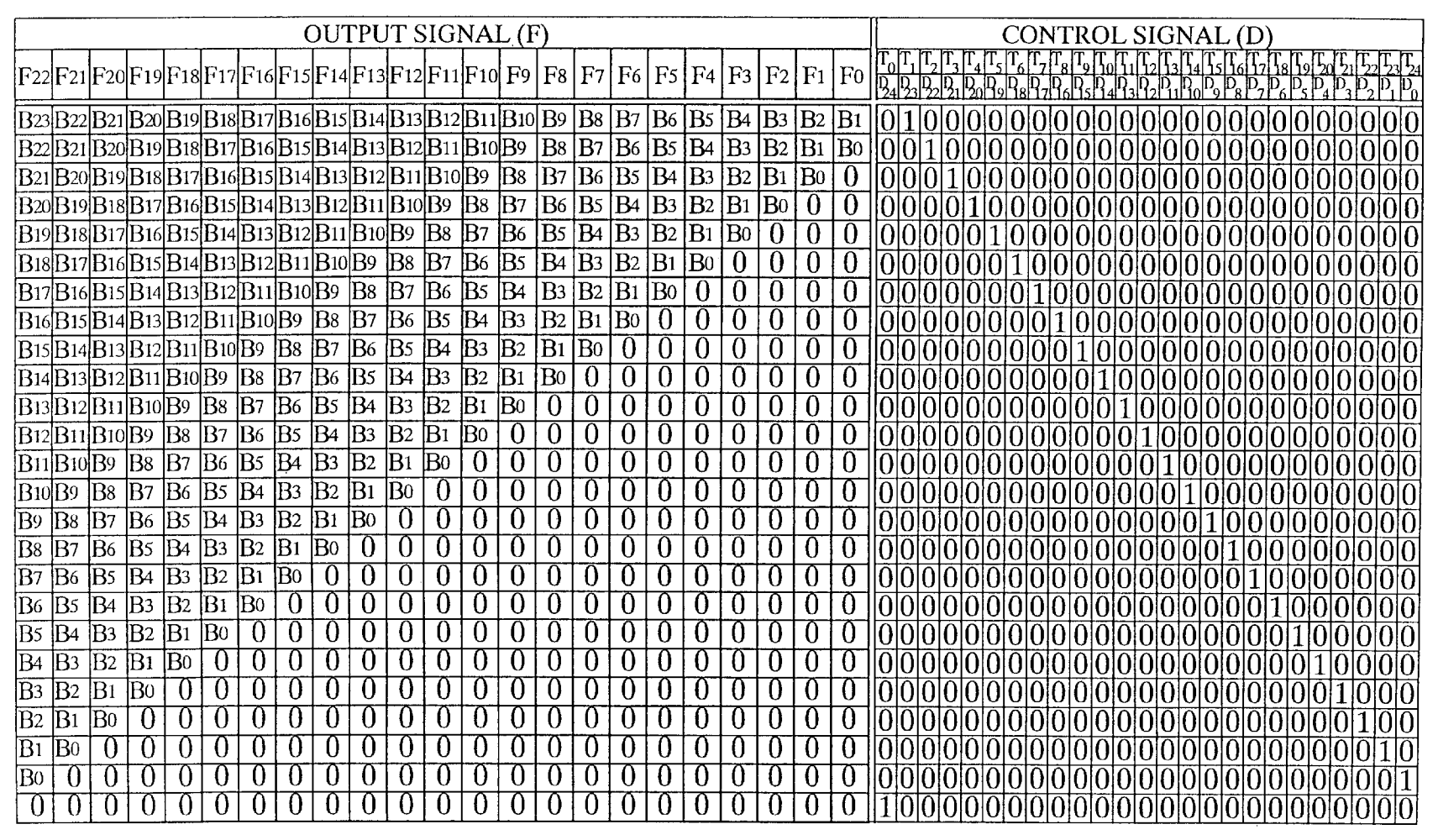

| OUTPUT SIGNAL (F) | | | | | | | | | | | | | | | | | | | | | | | CONTROL SIGNAL (D) | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| F22 | F21 | F20 | F19 | F18 | F17 | F16 | F15 | F14 | F13 | F12 | F11 | F10 | F9 | F8 | F7 | F6 | F5 | F4 | F3 | F2 | F1 | F0 | $T_0$ $D_{24}$ | $T_1$ $D_{23}$ | $T_2$ $D_{22}$ | $T_3$ $D_{21}$ | $T_4$ $D_{20}$ | $T_5$ $D_{19}$ | $T_6$ $D_{18}$ | $T_7$ $D_{17}$ | $T_8$ $D_{16}$ | $T_9$ $D_{15}$ | $T_{10}$ $D_{14}$ | $T_{11}$ $D_{13}$ | $T_{12}$ $D_{12}$ | $T_{13}$ $D_{11}$ | $T_{14}$ $D_{10}$ | $T_{15}$ $D_9$ | $T_{16}$ $D_8$ | $T_{17}$ $D_7$ | $T_{18}$ $D_6$ | $T_{19}$ $D_5$ | $T_{20}$ $D_4$ | $T_{21}$ $D_3$ | $T_{22}$ $D_2$ | $T_{23}$ $D_1$ | $T_{24}$ $D_0$ |
| B23 | B22 | B21 | B20 | B19 | B18 | B17 | B16 | B15 | B14 | B13 | B12 | B11 | B10 | B9 | B8 | B7 | B6 | B5 | B4 | B3 | B2 | B1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| B22 | B21 | B20 | B19 | B18 | B17 | B16 | B15 | B14 | B13 | B12 | B11 | B10 | B9 | B8 | B7 | B6 | B5 | B4 | B3 | B2 | B1 | B0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| B21 | B20 | B19 | B18 | B17 | B16 | B15 | B14 | B13 | B12 | B11 | B10 | B9 | B8 | B7 | B6 | B5 | B4 | B3 | B2 | B1 | B0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| B20 | B19 | B18 | B17 | B16 | B15 | B14 | B13 | B12 | B11 | B10 | B9 | B8 | B7 | B6 | B5 | B4 | B3 | B2 | B1 | B0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| B19 | B18 | B17 | B16 | B15 | B14 | B13 | B12 | B11 | B10 | B9 | B8 | B7 | B6 | B5 | B4 | B3 | B2 | B1 | B0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| B18 | B17 | B16 | B15 | B14 | B13 | B12 | B11 | B10 | B9 | B8 | B7 | B6 | B5 | B4 | B3 | B2 | B1 | B0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| B17 | B16 | B15 | B14 | B13 | B12 | B11 | B10 | B9 | B8 | B7 | B6 | B5 | B4 | B3 | B2 | B1 | B0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| B16 | B15 | B14 | B13 | B12 | B11 | B10 | B9 | B8 | B7 | B6 | B5 | B4 | B3 | B2 | B1 | B0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| B15 | B14 | B13 | B12 | B11 | B10 | B9 | B8 | B7 | B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| B14 | B13 | B12 | B11 | B10 | B9 | B8 | B7 | B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| B13 | B12 | B11 | B10 | B9 | B8 | B7 | B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| B12 | B11 | B10 | B9 | B8 | B7 | B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| B11 | B10 | B9 | B8 | B7 | B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| B10 | B9 | B8 | B7 | B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| B9 | B8 | B7 | B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| B8 | B7 | B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |
| B7 | B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| B6 | B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| B5 | B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| B4 | B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| B3 | B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| B2 | B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| B1 | B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| B0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG.14

| OUTPUT SIGNAL (B') (X...X SHOWS A BINARY NUMBER) | INPUT SIGNAL (B*) | | | | | | | | | | | | | | | | | | | | | | | |
|---|---|---|---|---|---|---|---|---|---|---|---|---|---|---|---|---|---|---|---|---|---|---|---|---|
| | B*23 | B*22 | B*21 | B*20 | B*19 | B*18 | B*17 | B*16 | B*15 | B*14 | B*13 | B*12 | B*11 | B*10 | B*9 | B*8 | B*7 | B*6 | B*5 | B*4 | B*3 | B*2 | B*1 | B*0 |
| 0(00000000) | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1(00000001) | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2(00000010) | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3(00000011) | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| 4(00000100) | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 5(00000101) | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 6(00000110) | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 7(00000111) | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| 8(00001000) | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| 9(00001001) | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 10(00001010) | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 11(00001011) | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 12(00001100) | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| 13(00001101) | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 14(00001110) | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| 15(00001111) | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |
| 16(00010000) | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 17(00010001) | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 18(00010010) | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| 19(00010011) | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| 20(00010100) | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| 21(00010101) | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 22(00010110) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| 23(00010111) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

FIG.19

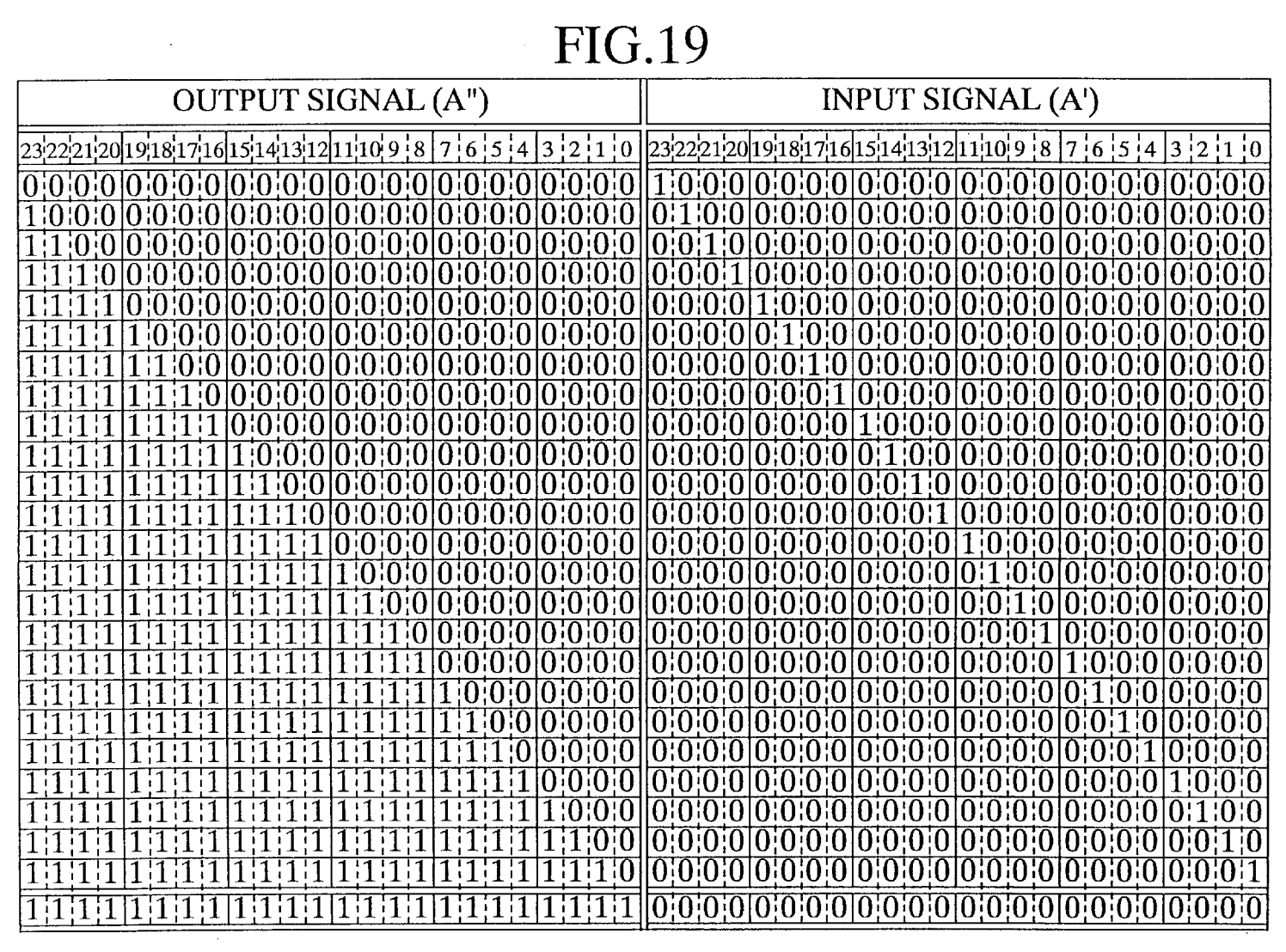

| OUTPUT SIGNAL (A") | | | | | | | | | | | | | | | | | | | | | | | | INPUT SIGNAL (A') | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

NORMALIZATION CIRCUITRY

BACKGROUND OF THE INVENTION

1. Field of the Invention

The present invention relates to a floating point computation device and, more particularly, to normalization circuitry which can normalize a floating point computation result in such a manner that its mantissa part lies in the range of 1≦the mantissa part<2, that is, the mantissa part of the floating point computation result is presented in the form 1.xxx (x is a "don't care" state) (this operation is called normalization), except when the exponent part of the floating point computation result is 0 and the mantissa part of the floating point computation result is therefore presented in the form 0.xxx (x is a "don't care" state) which is less than 1, and the computation result is represented as an unnormalized floating point number (this operation is called unnormalization), and except when the mantissa part of the floating point computation result is 0 and the exponent part of the floating point computation result is therefore set to 0 (this operation is called zero function).

2. Description of the Prior Art

A description will be made as to a method of representing a floating point number with single precision which complies with IEEE standard P754. In the case of single precision which complies with IEEE standard P754, a floating point number is expressed as a 32-bit binary word comprised of a sign bit S, the exponent part E of eight bits, and the mantissa part F of twenty-three bits. A floating point number having single precision which complies with IEEE standard P754 can be classified into either a normalized number or a unnormalized number. When the exponent part is greater than 0 and is less than 255, the floating point number is called "normalized number". The mantissa part of a normalized number satisfies the following relation: 1≦the mantissa part<2. Furthermore, since the most significant bit (MSB) of the mantissa part is 1 without exception, only lower-order bits of the mantissa part located below the MSB can be shown in the representation of a normalized number. A normalized number is thus expressed in the following equation:

$$\text{Normalized number}=(-1)^s\times(1+F\times2^{-23})\times2^{E-127}$$

On the other hand, a floating point number having its exponent part of 0 is called "unnormalized number". Such a unnormalized point number is expressed in the following equation:

$$\text{Unnormalized number}=(-1)^s\times(F\times2^{-23})\times2^{-126}$$

U.S. Pat. No. 5,103,418 discloses such prior normalization circuitry for use in floating point computation devices. In floating point arithmetic computations, computation results having the zero mantissa part can be generated inevitably. In such a case, it is needed to set the exponent part to zero by using the aforementioned zero function. However, the prior art normalization circuitry as disclosed in U.S. Pat. No. 5,103,418 does not include the zero function. Accordingly, an additional circuit having the zero function has to be incorporated into a floating point computation device equipped with such the prior art normalization circuitry.

SUMMARY OF THE INVENTION

It is therefore an object of the present invention to provide normalization circuitry having "normalization function", "unnormalization function", and "zero function", which can operate at a higher speed as compared with prior art normalization circuitry, thereby speeding up the operation of floating point computation devices into which the normalization circuitry according to the present invention can be incorporated.

In accordance with one aspect of the present invention, there is provided normalization circuitry comprising: a reference signal generating circuit for generating a reference signal one or more highmost bits of which are all set to 1 and the other bits of which are all set to 0 according to the value of a first input signal representing the exponent part of a floating point number to be processed when the value of the first input signal is greater than 0; otherwise, generating a reference signal all the bits of which are set to 0; a first AND gate for computing the logical AND of the reference signal generated by the reference signal generating circuit with a second input signal representing the mantissa part of the floating point number to be processed bit by bit; an OR gate for computing the logical OR of all the bits of the output of the first AND gate; a leading one detector for searching through all the bits of the second input signal from its most significant bit and then determining whether each bit of the second input signal is 1 or 0 to detect the bit position of the leading 1 of the second input signal, and then generate a signal only one bit at the detected bit position of which is set to 1 and to which one bit set to 0 is added as the most significant bit of the signal, or a signal only the most significant bit of which is set to 1 when all the bits of the second input signal except its least significant bit are 0; a signal line for delivering the most significant bit of the signal from the leading one detector as the most significant bit of a control signal representing a shift amount for shifting the second input signal; a one-bit shifter for shifting all the bits of the signal except its most significant bit from the leading one detector one bit position to the right; a decoder for decoding the first input signal into a signal having a bit width which is equal to that of the second input signal; a first selecting circuit for selecting and furnishing the output of the one-bit shifter as all the bits of the control signal except its most significant bit when the output of the OR gate is at logic 1, and for selecting and furnishing the output of the decoder as all the bits of the control signal except its most significant bit when the output of the OR gate is at logic 0; a shifter for shifting the second input signal by the shift amount represented by the control signal comprised of the most significant bit delivered thereto by way of the signal line and all the bits of the output of the first selecting circuit so as to generate a signal having a binary value representing the mantissa part of the floating point number processed; a priority encoder for searching through all the bits of the second input signal from its most significant bit and determining whether each bit of the second input signal is 1 or 0 so as to detect the bit position of the leading 1 of the second input signal and then subtract 1 from the number showing the bit position of the leading 1 counted from the most significant bit, and generate a signal having a binary value which corresponds to the subtraction result; and a second selecting circuit for furnishing a subtraction, result obtained by subtracting the value of the signal from the priority encoder from the value of the first input signal as an output signal representing the exponent part of the floating point number processed when the output of the OR gate is at logic 1, and for furnishing a signal having a binary value of 0 as the output signal representing the exponent part of the floating point number processed when the output of the OR gate is at logic 0.

In accordance with a preferred embodiment of the present invention, the second selecting circuit includes a subtracter for subtracting the value of the signal from the priority encoder from the value of the first input signal, and a second AND gate having its first input terminal connected to an output terminal of the subtracter and its second input terminal connected to an output terminal of the OR gate.

In accordance with another preferred embodiment of the present invention, the second selecting circuit includes a multiplexer circuit for furnishing the first input signal applied to a first input terminal thereof when the output of the OR gate is at logic 0, and for furnishing the output signal from the priority encoder applied to a second input terminal thereof when the output of the OR gate is at logic 1, and a subtracter for subtracting the value of the signal from the multiplexer circuit from the value of the first input signal.

Preferably, the shifter generates a signal having a binary value representing the mantissa part of the processed floating point number having a bit width which is less than that of the second input signal, by shifting the second input signal by the shift amount.

In accordance with another preferred embodiment of the present invention, the reference signal generating circuit generates a reference signal one or more highmost bits of which are all set to 1 and the other bits of which are all set to 0, the number of the highmost bits being defined by the value of the first input signal, or a reference signal all the bits of which are set to 0 directly from the first input signal.

In accordance with another preferred embodiment of the present invention, the reference signal generating circuit generates a reference signal one or more highmost bits of which are all set to 1 and the other bits of which are all set to 0, the number of the highmost bits being defined by the value of the first input signal, or a reference signal all the bits of which are all set to 0 from the output signal from the decoder.

In accordance with another aspect of the present invention, there is provided normalization circuitry comprising: a reference signal generating circuit for generating a reference signal one or more highmost bits of which are all set to 1 and the other bits of which are all set to 0 according to the value of a first input signal representing the exponent part of a floating point number to be processed when the value of the first input signal is greater than 0; otherwise, generating a reference signal all the bits of which are set to 0; a first AND gate for computing the logical AND of the reference signal generated by the reference signal generating circuit with a second input signal representing the mantissa part of the floating point number to be processed bit by bit; an OR gate for computing the logical OR of all the bits of the output of the first AND gate; a leading one detector for searching through all the bits of the second input signal from its most significant bit and then determining whether each bit of the second input signal is 1 or 0 to detect the bit position of the leading 1 of the second input signal, and then generate a signal only one bit at the detected bit position of which is set to 1 and to which one bit set to 0 is added as the most significant bit of the signal, or a signal only the most significant bit of which is set to 1 when all the bits of the second input signal except its least significant bit are 0; a signal line for delivering the most significant bit of the signal from the leading one detector as the most significant bit of a control signal representing a shift amount for shifting the second input signal; a one-bit shifter for shifting all the bits of the signal except its most significant bit from the leading one detector one bit position to the right; a decoder for decoding the first input signal into a signal having a bit width which is equal to that of the second input signal; a first selecting circuit for selecting and furnishing the output of the one-bit shifter as all the bits of the control signal except its most significant bit when the output of the OR gate is at logic 1, and for selecting and furnishing the output of the decoder as all the bits of the control signal except its most significant bit when the output of the OR gate is at logic 0; a shifter for shifting the second input signal by the shift amount represented by the control signal comprised of the most significant bit delivered thereto by way of the signal line and all the bits of the output of the first selecting circuit so as to generate a signal having a binary value representing the mantissa part of the floating point number processed; a second AND gate for computing the logical AND of the least significant bit of the second input signal with the most significant bit of the signal from the leading one detector; an encoder for determining whether each bit of a binary number comprised of all the bits of the signal except the most significant bit from the leading one detector and the output of the second AND gate as its least significant bit is 1 or 0 while searching through all the bits of the binary number from its most significant bit so as to detect the bit position of the leading 1 of the binary number and then subtract 1 from the number showing the bit position of the leading 1 counted from the most significant bit, and generate a signal having a binary value which corresponds to the subtraction result; and a second selecting circuit for furnishing a subtraction result obtained by subtracting the value of the signal from the encoder from the value of the first input signal as an output signal representing the exponent part of the floating point number processed when the output of the OR gate is at logic 1, and for furnishing a signal having a binary value of 0 as the output signal representing the exponent part of the floating point number processed when the output of the OR gate is at logic 0.

In accordance with a preferred embodiment of the present invention, the second selecting circuit includes a subtracter for subtracting the value of the signal from the encoder from the value of the first input signal, and a third AND gate having its first input terminal connected to an output terminal of the subtracter and its second input terminal connected to an output terminal of the OR gate.

In accordance with another preferred embodiment of the present invention, the second selecting circuit includes a multiplexer circuit for furnishing the first input signal applied to a first input terminal thereof when the output of the OR gate is at logic 0, and for furnishing the output signal from the encoder applied to a second input terminal thereof when the output of the OR gate is at logic 1, and a subtracter for subtracting the value of the signal from the multiplexer circuit from the value of the first input signal.

Preferably, the shifter generates a signal having a binary value representing the mantissa part of the processed floating point number having a bit width which is less than that of the second input signal, by shifting the second input signal by the shift amount.

In accordance with another preferred embodiment of the present invention, the reference signal generating circuit generates a reference signal one or more highmost bits of which are all set to 1 and the other bits of which are all set to 0, the number of the highmost bits being defined by the value of the first input signal, or a reference signal all the bits of which are set to 0 directly from the first input signal.

In accordance with another preferred embodiment of the present invention, the reference signal generating circuit generates a reference signal one or more highmost bits of which are all set to 1 and the other bits of which are all set to 0, the number of the highmost bits being defined by the value of the first input signal, or a reference signal all the bits of which are all set to 0 from the output signal from the decoder.

Further objects and advantages of the present invention will be apparent from the following description of the preferred embodiments of the invention as illustrated in the accompanying drawings.

BRIEF DESCRIPTION OF THE DRAWINGS

FIG. 2 is a diagram showing the truth table of a decoder in the normalization circuitry shown in FIG. 1;

FIG. 4 is a diagram showing the truth table of a leading one detector in the normalization circuitry shown in FIG. 1;

FIG. 6 is a diagram showing the truth table of a priority encoder in the normalization circuitry shown in FIG. 1;

FIG. 7 is a diagram showing the truth table of a reference signal generating circuit in the normalization circuitry shown in FIG. 1;

FIG. 9 is a diagram showing the truth table of a shifter in the normalization circuitry shown in FIG. 1;

FIG. 14 is a diagram showing the truth table of an encoder in the normalization circuitry shown in FIG. 13;

FIG. 19 is a diagram showing the truth table of a reference signal table circuit in the normalization circuitry shown in FIG. 18;

DETAILED DESCRIPTION OF THE PREFERRED EMBODIMENTS

First Embodiment

Figure 1:
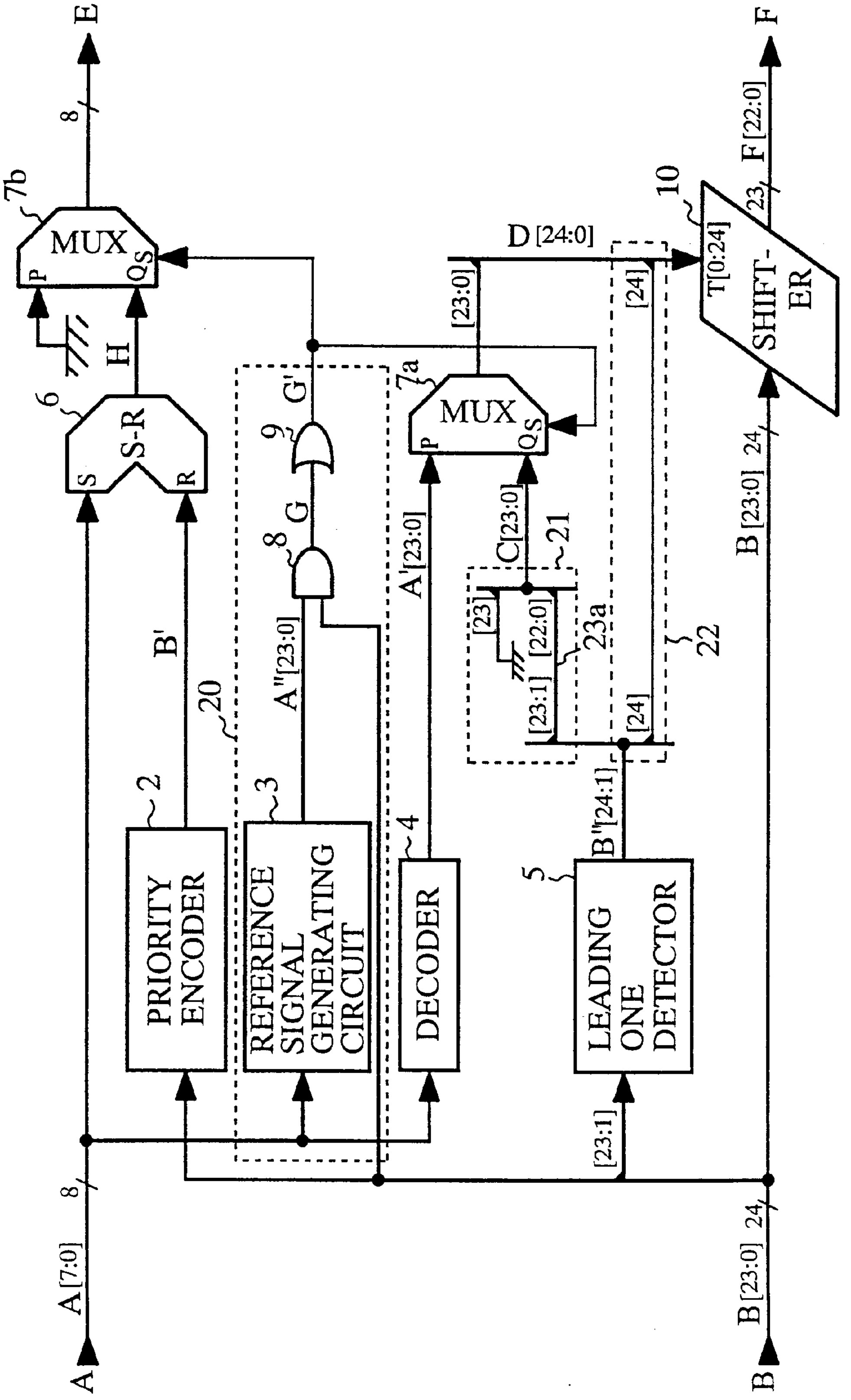
FIG. 1 is a block diagram showing the structure of normalization circuitry according to a first embodiment of the present invention.

Referring now to FIG. 1, there is illustrated a block diagram showing the structure of normalization circuitry according to a first embodiment of the present invention for use in floating point computation devices. In FIG. 1, reference numeral 2 denotes a priority encoder, 3 denotes a reference signal generating circuit, 4 denotes a decoder, 5 denotes a leading one detector, 6 denotes a subtracter, 7*a* denotes a first multiplexer (MUX) circuit, 7*b* denotes a second MUX circuit, 8 denotes an AND gate, 9 denotes an OR gate, 10 denotes a shifter, 21 denotes a one-bit right shifter for shifting a binary number applied thereto one bit position to the right, and 20 denotes a selecting signal generating unit.

In FIG. 1, reference character A denotes an input binary number, i.e., an input signal representing the exponent part of a floating point number to be processed by the normalization circuitry of this embodiment, B denotes another input binary number, i.e., another input signal representing the mantissa part of the floating point number to be processed by the normalization circuitry of this embodiment, and E denotes an output binary number, i.e., an output signal representing the exponent part of the floating point number processed by the normalization circuitry, e.g., normalized, unnormalized, or on which the zero function is performed. Furthermore, reference numeral D denotes a binary number, i.e., a control signal representing a shift amount for normalizing the input signal B representing the mantissa part of the floating point number to be processed, and F denotes another output binary number, i.e., another output signal representing the mantissa part of the floating point number processed by the normalization circuitry of this embodiment. In addition, each notation [n:m] shown aside each character showing each signal in FIG. 1 indicates that a corresponding binary number is comprised of (n−m+1) bits from bit m to bit n.

Next, a description will be made as to functions of the respective components of the normalization circuitry adapted to receive an 8-bit input signal A representing the exponent part of a floating point number to be processed and a 24-bit input signal B representing the mantissa part of the floating point number, furnish an 8-bit output signal E representing the exponent part of the floating point number processed by this circuitry and a 23-bit output signal F representing the mantissa part of the floating point number processed by this circuitry, and generate a 25-bit control signal D representing a shift amount for shifting the input signal B.

Figure 3:
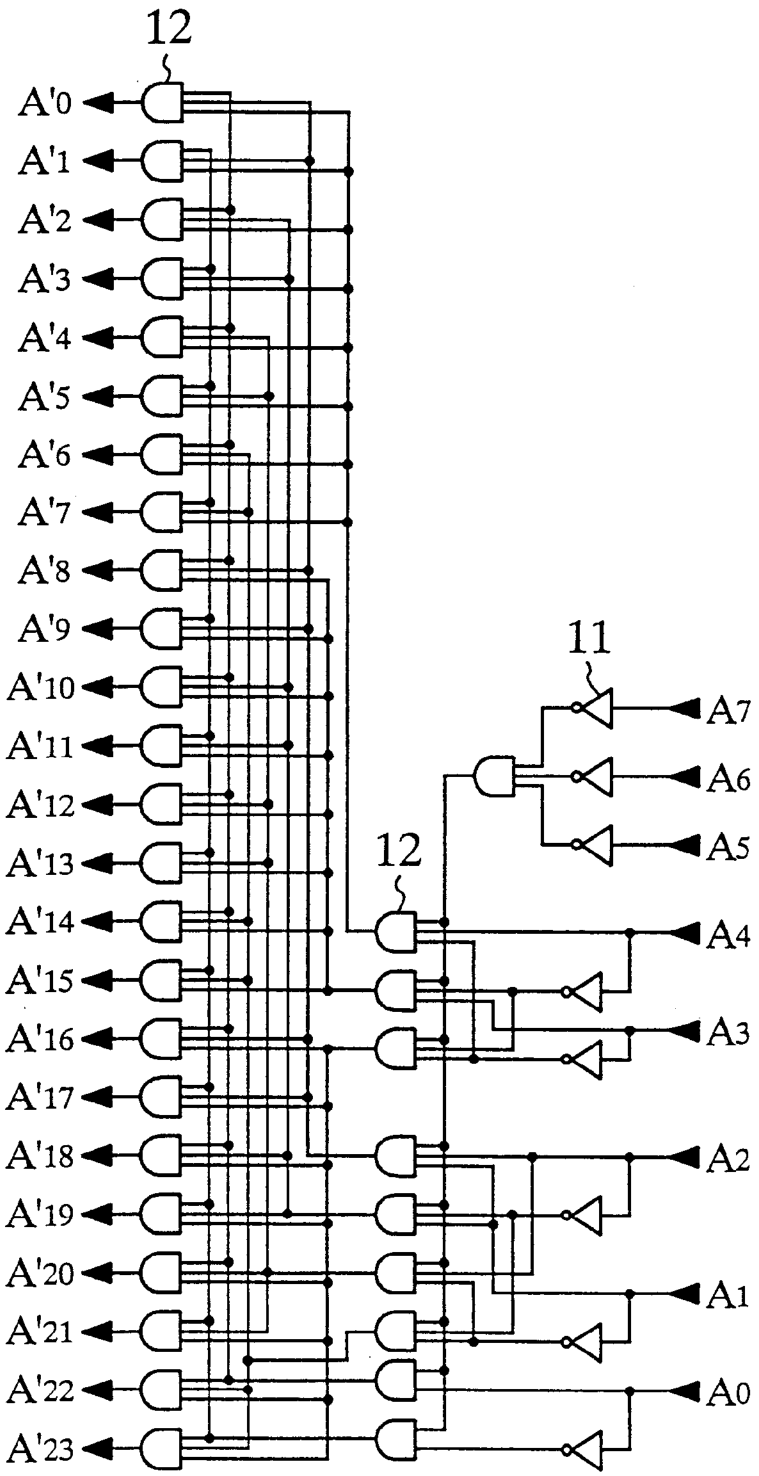
FIG. 3 is a schematic circuit diagram of the decoder.

The decoder 4 decodes the input signal A representing an 8-bit binary word. FIG. 2 shows the truth table of the decoder 4. Referring next to FIG. 3, there is illustrated a schematic circuit diagram showing an example of the decoder 4. In the figure, reference numeral 11 denotes an inverter, i.e., NOT gate, and 12 denotes an AND gate.

Figure 5:
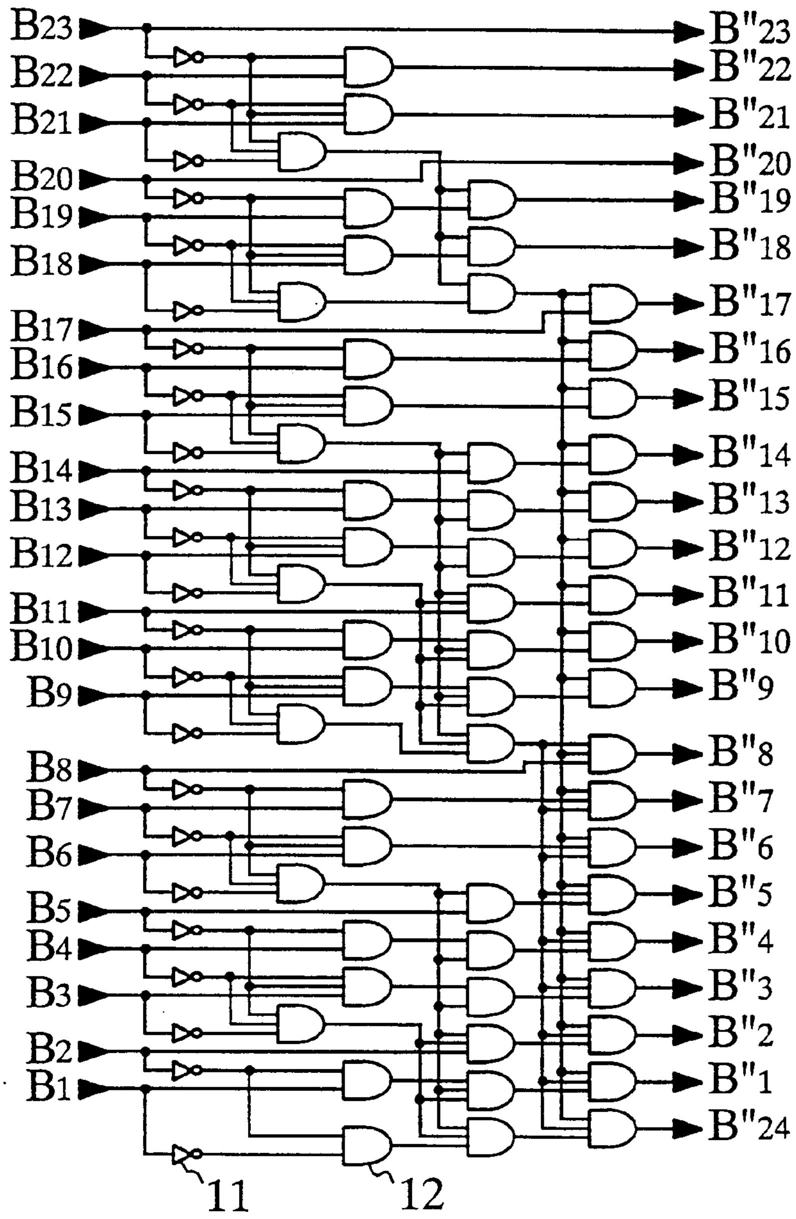
FIG. 5 is a schematic circuit diagram of the leading one detector.

When the leading one detector 5 receives all the bits of the input signal B except the least significant bit $B_0$, the leading one detector 5 determines whether or not each bit of the input signal B except the least significant bit is 1 while searching through all the bits of the input signal B except the least significant bit from the most significant bit $B_{23}$ to detect the bit position of the leading 1 of the input signal B. The leading one detector 5 then generates a 24-bit signal B" only one bit at the bit position detected of which is set to 1, as shown in the truth table of the leading one detector 5 of FIG. 4. When all the bits of the input signal B except the least significant bit $B_0$ are 0, the leading one detector 5 generates a 24-bit signal B" the most significant bit (i.e., $B''_{24}$) of which is set to 1, and other bits 23 through 1 (i.e., $B''_{23}$ through $B''_1$) of which are all set to 0. All the bits of the output signal B" except the most significant bit $B''_{24}$ from the leading one detector are delivered to the one-bit right shifter 21. The most significant bit $B''_{24}$ is delivered as the most significant bit of the signal D to the shifter 10 by way of a signal line 22 shown in FIG. 1. Referring next to FIG. 5, it illustrates the structure of an example of the leading one detector 5. In FIG. 5, reference numeral 11 denotes an inverter (i.e., NOT gate), and 12 denotes an AND gate.

The priority encoder 2 determines whether or not each bit of the input signal B is 1 while searching through all the bits of the input signal B from the most significant bit $B_{23}$to detect the bit position of the leading 1 of the input signal B. The priority encoder 2 then generates a signal B' having a binary value obtained by subtracting 1 from the number showing the bit position of the leading 1 counted from the most significant bit $B_{23}$, as shown in the truth table of the priority encoder 2 of FIG. 6. The bit width of the output signal B' in the case where the input signal B is n bits long is $\{int(log_2(n-1))+1\}$ bits long. Accordingly, when the input signal B applied to the priority encoder 2 is of 24 bits, the bit width of the output signal B' is 5 bits. When all the bits of the input signal B are 0, the priority encoder 2 generates an output signal B' having a value of 0, as shown in FIG. 6.

Figure 8:
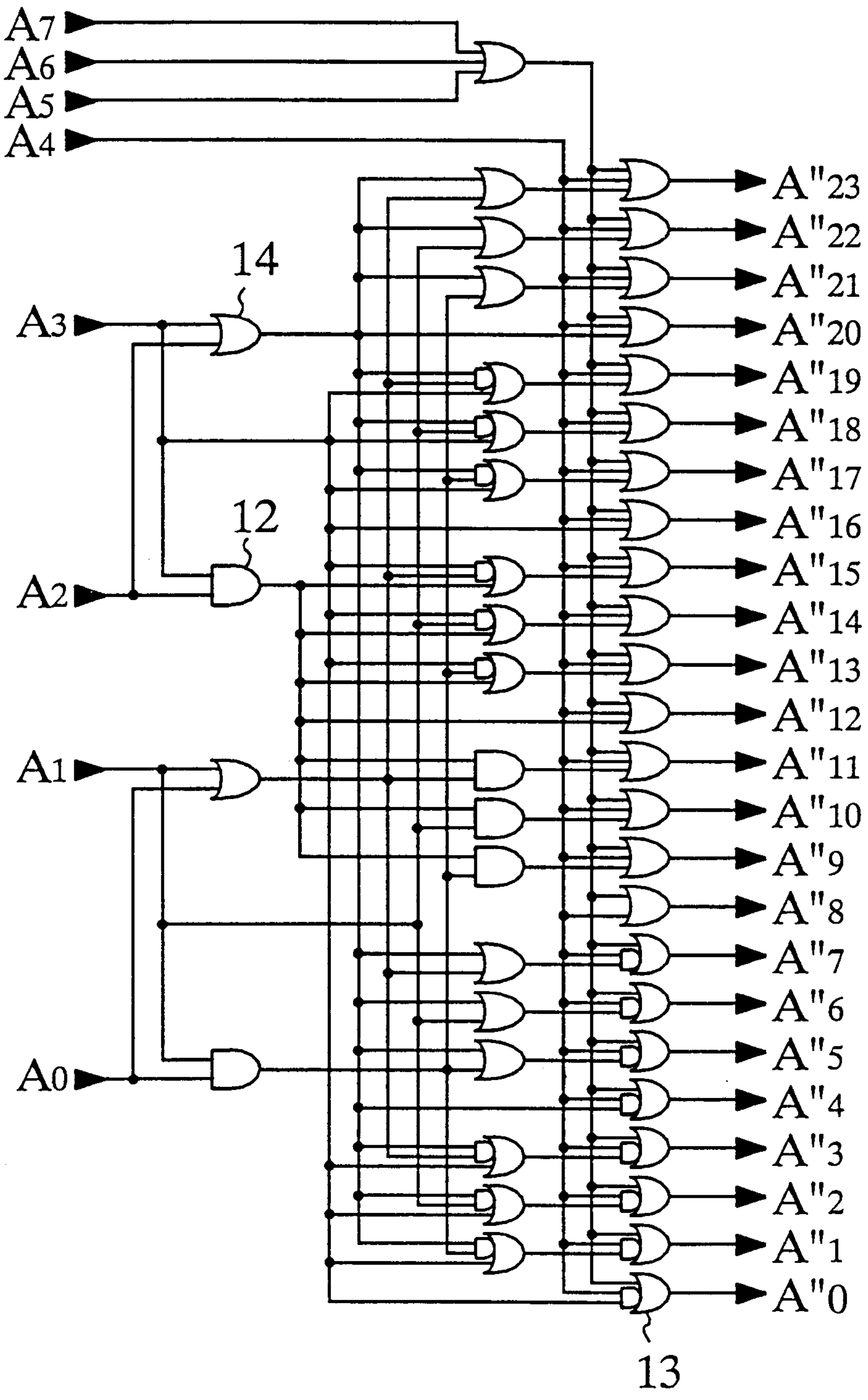
FIG. 8 is a schematic circuit diagram of the reference signal generating circuit.

The reference signal generating circuit 3 sets to 1 one or more highmost bits of its output signal A" for the decimal number represented by the input binary word A if the value of the binary word A is greater than 0, as shown in the truth table of the reference signal generating circuit 3 of FIG. 7. When the value of the input signal A is 0, the reference signal generating circuit 3 generates an output signal A" all the bits of which are set to 0. In other words, when the value of the input signal A is n (>0) in decimal, the reference signal generating circuit 3 generates an output signal A" the n highmost bits of which are set to 1 and the other bits of which are all set to 0. Furthermore, when the value of the input signal A is greater than or equal to 24 in decimal, the reference signal generating circuit 3 generates an output signal A" all the bits of which are set to 1. Referring next to FIG. 8, it shows an example of the reference signal generating circuit 3. In the figure, 12 denotes an AND gate, 13 denotes an AND-OR gate, and 14 denotes an OR gate.

The subtracter 6 receives the input signal A by way of its first input terminal S and the output signal B' from the priority encoder 2 by way of its second input terminal R. The subtracter 6 subtracts the value of the signal B' from the value of the input signal A and then delivers the subtraction result (A–B') as an output signal H to the MUX circuit 7*b* by way of its output terminal S-R.

The MUX circuit 7*b* selects either an input signal having a ground potential applied to its first input terminal P or the output signal H from the subtracter 6 applied to its second input terminal Q according to the level of a selecting signal G' applied thereto by way of its control terminal S so as to furnish the selected signal as the output signal E. When the selecting signal G' is at logic 0, the MUX circuit 7*b* selects the input signal having a ground potential as the output signal E. When the selecting signal G' is at logic 1, the MUX circuit 7*b* selects the output signal H from the subtracter 6 as the output signal E.

The MUX circuit 7*a* selects either the output signal A' from the decoder 4 applied to its first input terminal P or an output signal C from the one-bit right shifter 21 applied to its second input terminal Q according to the level of the selecting signal G' applied thereto by way of its control terminal S so as to furnish the selected signal as the control signal D representing a shift amount applied to the shifter 10. When the selecting signal G' is at logic 0, the MUX circuit 7*a* selects the output signal A' from the decoder 4 as the control signal D. When the selecting signal G' is at logic 1, the MUX circuit 7*a* selects the output signal C from the one-bit right shifter 21 as the control signal D.

Figure 10:
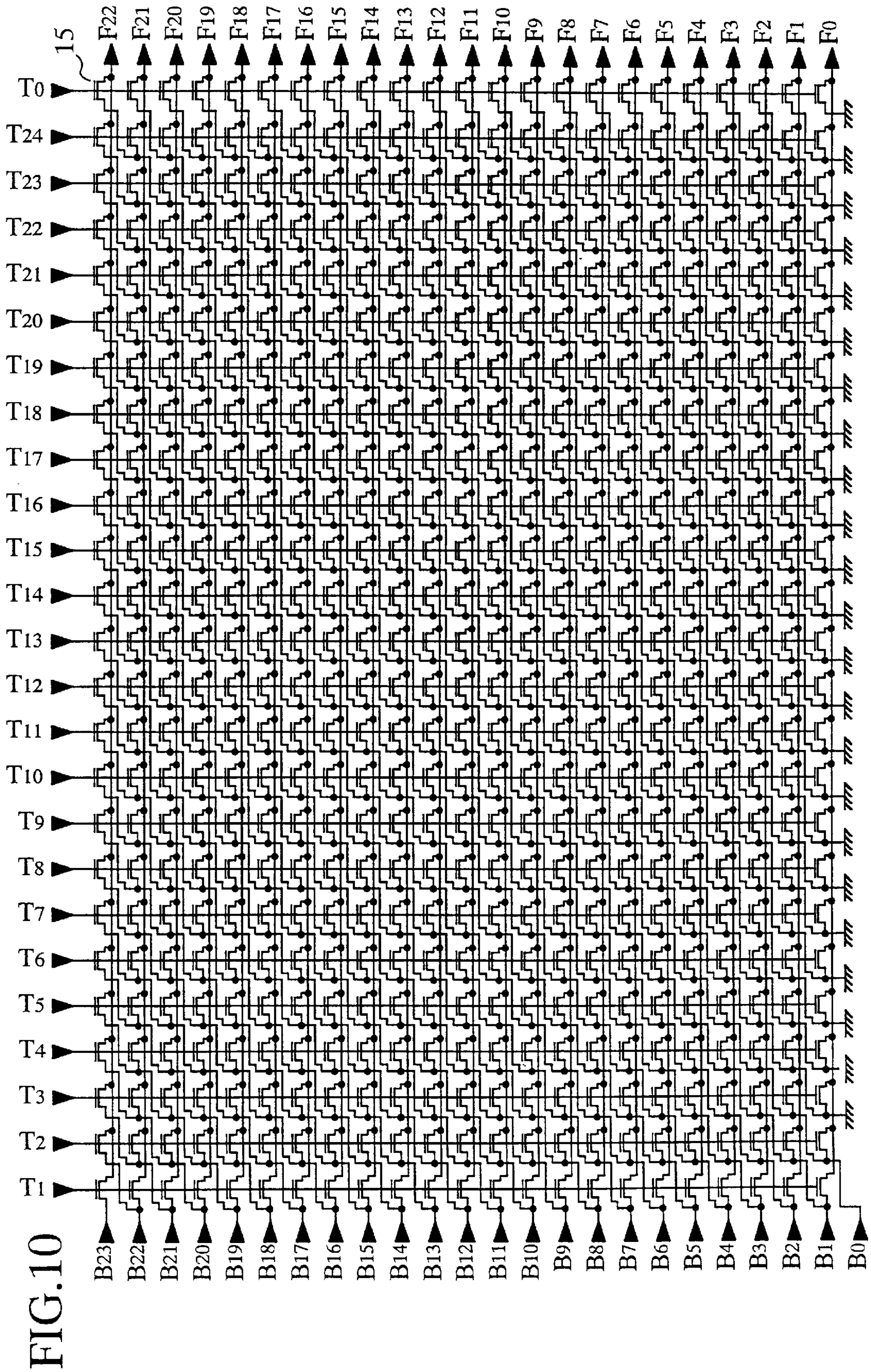
FIG. 10 is a schematic circuit diagram of the shifter.

The shifter 10 shifts the input signal B according to the control signal D (or T) applied thereto. FIG. 9 shows the truth table of the shifter 10. Furthermore, FIG. 10 shows an example of the shifter 10. In FIG. 10, reference numeral 15 denotes an N-channel MOS type FET.

Next, a description will be made as to the operation of the normalization circuitry of this embodiment. Consider that the value of the input signal A representing the exponent part of a floating point number to be processed is 127 in decimal and the binary value of the input signal B representing the mantissa part of the floating point number is 0000 0001 0001 0001 0001 0001. This is an example of normalization. The normalization circuitry carries out normalization for the floating point number applied thereto as follows:

(1) The reference signal generating circuit 3 generates an output signal A" having a binary value of 1111 1111 1111 1111 1111 1111, as shown in FIG. 7, because the value of the input signal A is greater than 24 in decimal.

(2) The AND gate 8 then delivers an output signal G having a binary value of 0000 0001 0001 0001 0001 0001.

(3) The OR gate 9 computes the logical OR of all the bits of the output signal G from the AND gate 8 and then furnishes an output signal G' at logic 1.

(4) When the priority encoder 2 receives the input signal B representing the mantissa part of the floating point number to be normalized, it delivers an output signal B' having a decimal value of 7 (i.e., a binary value of 00111) to the subtracter 6.

(5) The subtracter 6 subtracts the value of the signal B' from the priority encoder 2 from the value of the input signal A and then generates the output signal H having a value which is equal to the subtraction result (127–7)=120.

(6) The MUX circuit 7*b* then selects the signal H having a value of 120 from the subtracter 6 applied thereto via its second input terminal Q as the output signal E in response to the selecting signal G' at logic 1 from the OR gate 9.

(7) When the decoder 4 receives the input signal A, it generates an output signal A' having a binary value of 0000 0000 0000 0000 0000 0000 according to the truth table shown in FIG. 2.

(8) When the leading one detector 5 receives all the bits of the input signal B except the least significant bit $B_0$, it generates an output signal B" having a binary value of 0 0000 0001 0000 0000 0000 000 according to the truth table shown in FIG. 4.

(9) The one-bit right shifter 21 shifts all the bits of the signal B" except the most significant bit $B''_{24}$ one bit position to the right and then delivers an output signal C having a binary value of 0000 0000 1000 0000 0000 0000 to the MUX circuit 7*a*.

(10) The MUX circuit 7*a* then selects and delivers the signal C from the one-bit right shifter 21 applied thereto via its second terminal Q to the shifter 10 as bits $D_{23}$ through $D_0$ of the control signal in response to the selecting signal G' at logic 1 from the OR gate 9. Furthermore, the most significant bit B"24 of the signal B" is delivered to the shifter 10 as the most significant bit $D_{24}$ of the control signal as well. The binary value of the control signal applied to the shifter 10 is thus given as 0 0000 0000 1000 0000 0000 0000.

(11) Te shifter 10 then shifts the input signal B according to the value of the control signal D applied thereto and then generates an output signal F having a binary value of 000 1000 1000 1000 1000 0000.

Next, consider that the value of the input signal A representing the exponent part of a floating point number to be processed is 5 in decimal and the binary value of the input signal B representing the mantissa part of the floating point number to be processed is 0000 0001 0001 0001 0001 0001. This is an example of unnormalization. The normalization circuitry carries out unnormalization for the floating point number applied thereto as follows:

(1) The reference signal generating circuit 3 generates an output signal A" having a binary value of 1111 1000 0000 0000 0000 0000 according to the truth table shown in FIG. 7.

(2) The AND gate 8 then delivers an output signal G having a binary value of 0000 0000 0000 0000 0000 0000.

(3) The OR gate 9 computes the logical OR of all the bits of the output signal G from the AND gate 8 and then furnishes an output signal G' at logic 0.

(4) When the priority encoder 2 receives the input signal B representing the mantissa part of the floating point number to be unnormalized, it delivers an output signal B' having a decimal value of 7 (i.e., a binary value of 00111) to the subtracter 6.

(5) The subtracter 6 subtracts the value of the signal B' from the priority encoder 2 from the value of the input signal A and then generates an output signal H having the value which is equal to the subtraction result (5−7)=−2.

(6) The MUX circuit 7*b* then selects an input signal having a ground potential (i.e., a value of zero) applied thereto via its first terminal P as the output signal E in response to the selecting signal G' at logic 0 from the OR gate 9.

(7) When the decoder 4 receives the input signal A, it generates an output signal A' having a binary value of 0000 0100 0000 0000 0000 0000 according to the truth table shown in FIG. 2.

(8) When the leading one detector 5 receives all the bits of the input signal B except the least significant bit $B_0$, it generates an output signal B" having a binary value of 0 0000 0001 0000 0000 0000 000 according to the truth table shown in FIG. 4.

(9) The one-bit right shifter 21 shifts all the bits of the signal B" except the most significant bit $B''_{24}$ one bit position to the right and then delivers an output signal C having a binary value of 0000 0000 1000 0000 0000 0000 to the MUX circuit 7*a*.

(10) The MUX circuit 7*a* then selects and delivers the signal A' from the decoder 4 applied thereto via its first terminal P to the shifter 10 as bits $D_{23}$ through $D_0$ of the control signal D in response to the selecting signal G' at logic 0 from the OR gate 9. The most significant bit $B''_{24}$ is delivered to the shifter 10 as the most significant bit $D_{24}$ of the control signal D as well. The binary value of the control signal D is thus given as 0 0000 0100 0000 0000 0000 0000.

(11) The shifter 10 shifts the input signal B according to the value of the control signal D applied thereto and then generates an output signal F having a binary value of 001 0001 0001 0001 00010 0000.

Next, consider that the value of the input signal A representing the exponent part of a floating point number to be processed is 7 in decimal and the binary value of the input signal B representing the mantissa part of the floating point number to be processed is 0000 0001 0001 0001 0001 0001. This is another example of unnormalization. The normalization circuitry carries out unnormalization for the floating point number applied thereto as follows:

(1) The reference signal generating circuit 3 generates an output signal A" having a binary value of 1111 1110 0000 0000 0000 0000 according to the truth table shown in FIG. 7.

(2) The AND gate 8 then delivers an output signal G having a binary value of 0000 0000 0000 0000 0000 0000.

(3) The OR gate 9 computes the logical OR of all the bits of the output signal G from the AND gate 8 and therefore furnishes an output signal G' at logic 0.

(4) When the priority encoder 2 receives the input signal B representing the mantissa part of the floating point number to be unnormalized, it delivers an output signal B' having a decimal value of 7 (i.e., a binary value of 00111) to the subtracter 6.

(5) The subtracter 6 subtracts the value of the signal B' from the priority encoder 2 from the value of the input signal A and then generates an output signal H having the value which is equal to the subtraction result (7−7)=0.

(6) The MUX circuit 7*b* then selects an input signal having a groung potential (i.e., a value of zero) applied thereto via its first terminal P as the output signal E in response to the selecting signal G' at logic 0 from the OR gate 9.

(7) When the decoder 4 receives the input signal A, it generates the output signal A' having a binary value of 0000 0001 0000 0000 0000 0000 according to the truth table shown in FIG. 2.

(8) When the leading one detector 5 receives all the bits of the input signal B except the least significant bit $B_0$, it generates an output signal B" having a binary value of 0 0000 0001 0000 0000 0000 000 according to the truth table shown in FIG. 4.

(9) The one-bit right shifter 21 shifts all the bits of the signal B" except the most significant bit $B''_{24}$ one bit position to the right and then delivers an output signal C having a binary value of 0000 0000 1000 0000 0000 0000 to the MUX circuit 7*a*.

(10) The MUX circuit 7*a* then selects and delivers the signal A' from the decoder 4 applied thereto via its first terminal P to the shifter 10 as bits $D_{23}$ through $D_0$ of the control signal D in response to the selecting signal G' at logic 0 from the OR gate 9. The most significant bit $B''_{24}$ is delivered to the shifter 10 as the most significant bit $D_{24}$ of the control signal D as well. The binary value of the control signal D is thus given as 0 0000 0001 0000 0000 0000 0000.

(11) When the shifter 10 receives the input signal B, it shifts the input signal B according to the value of the control signal D applied thereto by way of its control terminal T and then generates the output signal F having a binary value of 100 0100 0100 0100 0100 0000.

As explained above, the normalization circuitry of the first embodiment can carry out unnormalization properly even though the value of the output signal H from the subtracter 6 is 0.

Consider that the value of the input signal A representing the exponent part of a floating point number to be processed is 127 in decimal and the binary value of the input signal B representing the mantissa part of the floating point number is 0000 0000 0000 0000 0000 0000. This is an example of the zero function. The normalization circuitry carries out the zero function for the floating point number applied thereto as follows:

(1) The reference signal generating circuit 3 generates an output signal A" having a binary value of 1111 1111 1111 1111 1111 1111 according to the truth table shown in FIG. 7.

(2) The AND gate 8 then delivers an output signal G having a binary value of 0000 0000 0000 0000 0000 0000.

(3) The OR gate 9 computes the logical OR of all the bits of the output signal G from the AND gate 8 and therefore furnishes an output signal G' at logic 0.

(4) When the priority encoder 2 receives the input signal B representing the mantissa part of the floating point number on which the zero function is to be performed, it delivers an output signal B' having a decimal value of 0 (i.e., a binary value of 00000) to the subtracter 6.

(5) The subtracter 6 subtracts the value of the signal B' from the priority encoder 2 from the value of the input signal A and then generates an output signal H having a value which is equal to the subtraction result (127−0)=127.

(6) The MUX circuit 7*b* then selects an input signal having a groung potential (i.e., a value of zero) applied thereto via its first terminal P as the output signal E in response to the selecting signal G' at logic 0 from the OR gate 9.

(7) When the decoder 4 receives the input signal A, it generates an output signal A' having a binary value of 0000 0000 0000 0000 0000 0000 according to the truth table shown in FIG. 2.

(8) When the leading one detector 5 receives all the bits of the input signal B except the least significant bit $B_0$, it generates an output signal B" having a binary value of 1 0000 0000 0000 0000 0000 000 according to the truth table shown in FIG. 4.

(9) The one-bit right shifter 21 shifts all the bits of the signal B" except the most significant bit $B''_{24}$ one bit position to the right and then delivers an output signal C having a binary value of 0000 0000 0000 0000 0000 0000 to the MUX circuit 7*a*.

(10) The MUX circuit 7*a* then selects and delivers the signal A' from the decoder 4 applied thereto via its first terminal P to the shifter 10 as bits $D_{23}$ through $D_0$ of the control signal D in response to the selecting signal G' at logic 0 from the OR gate 9. The most significant bit $B''_{24}$ of the signal B" from the leading one detector 5 is delivered to the shifter 10 as the most significant bit $D_{24}$ of the control signal D as well. The binary value of the control signal D is thus given as 1 0000 0000 0000 0000 0000 0000.

(11) The shifter 10 shifts the input signal B according to the value of the control signal D applied thereto and then generates an output signal F having a binary value of 000 0000 0000 0000 0000 0000.

Figure 11:
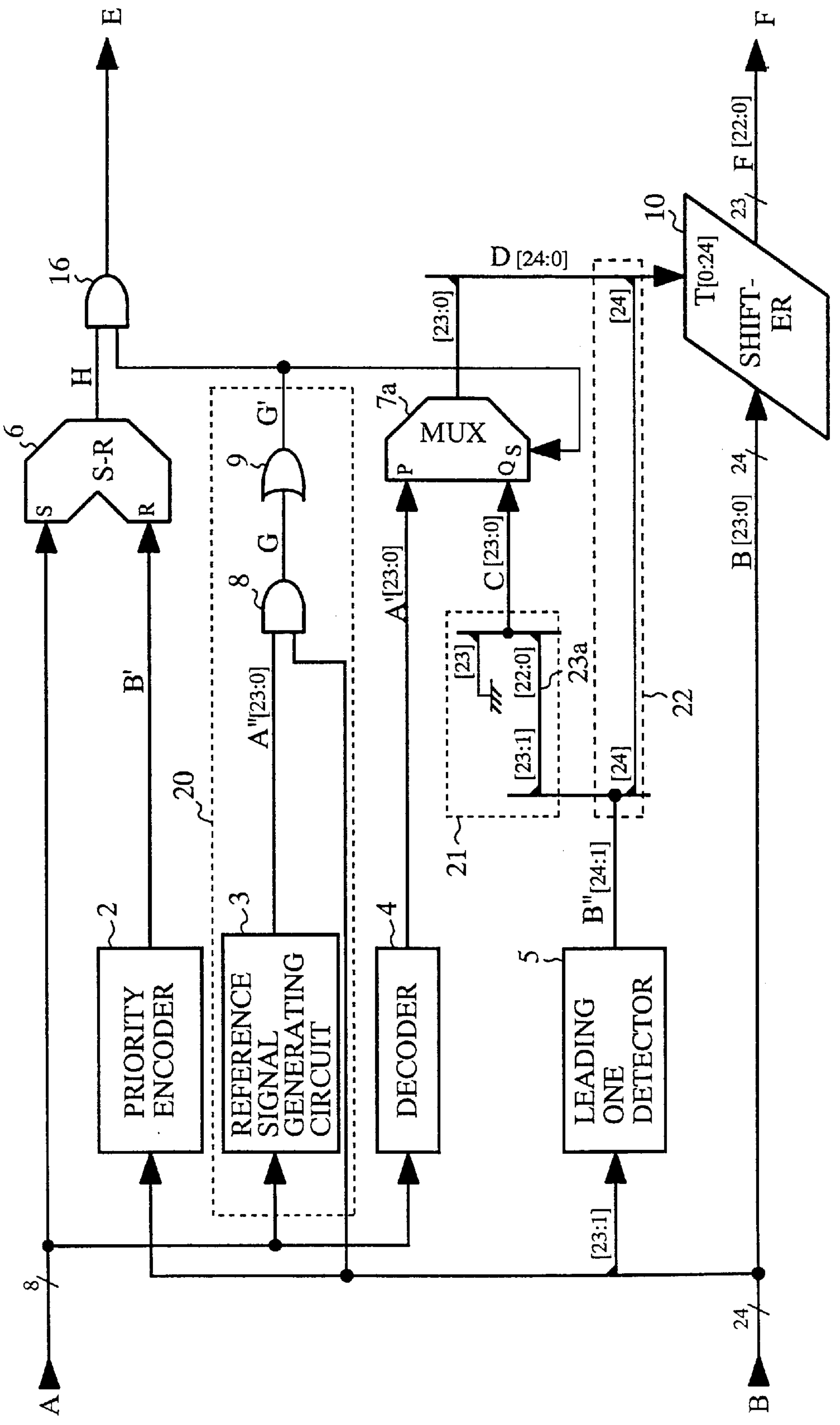
FIG. 11 is a block diagram showing the structure of a variant of the first embodiment in which a multiplexer circuit is replaced by an AND gate.

Referring next to FIG. 11, there is illustrated a schematic circuit diagram of a variant of the first embodiment of the present invention. As shown in FIG. 11, there is provided another two-input AND gate 16 having a first input terminal connected the output terminal (S-R) of the subtracter 6 and a second input terminal connected to the output terminal of the OR gate 9 instead of the MUX circuit 7*b* shown in FIG. 1. In the variant, the output signal E showing the mantissa part goes logic 0 when the signal G' from the OR gate is at logic 0, otherwise the output signal H from the subtracter 6 is delivered as the output signal E. Thus the variant offers an advantage of being able to implement the zero function without incorporating an additional circuit into the floating point computation device.

Second Embodiment

Figure 12:
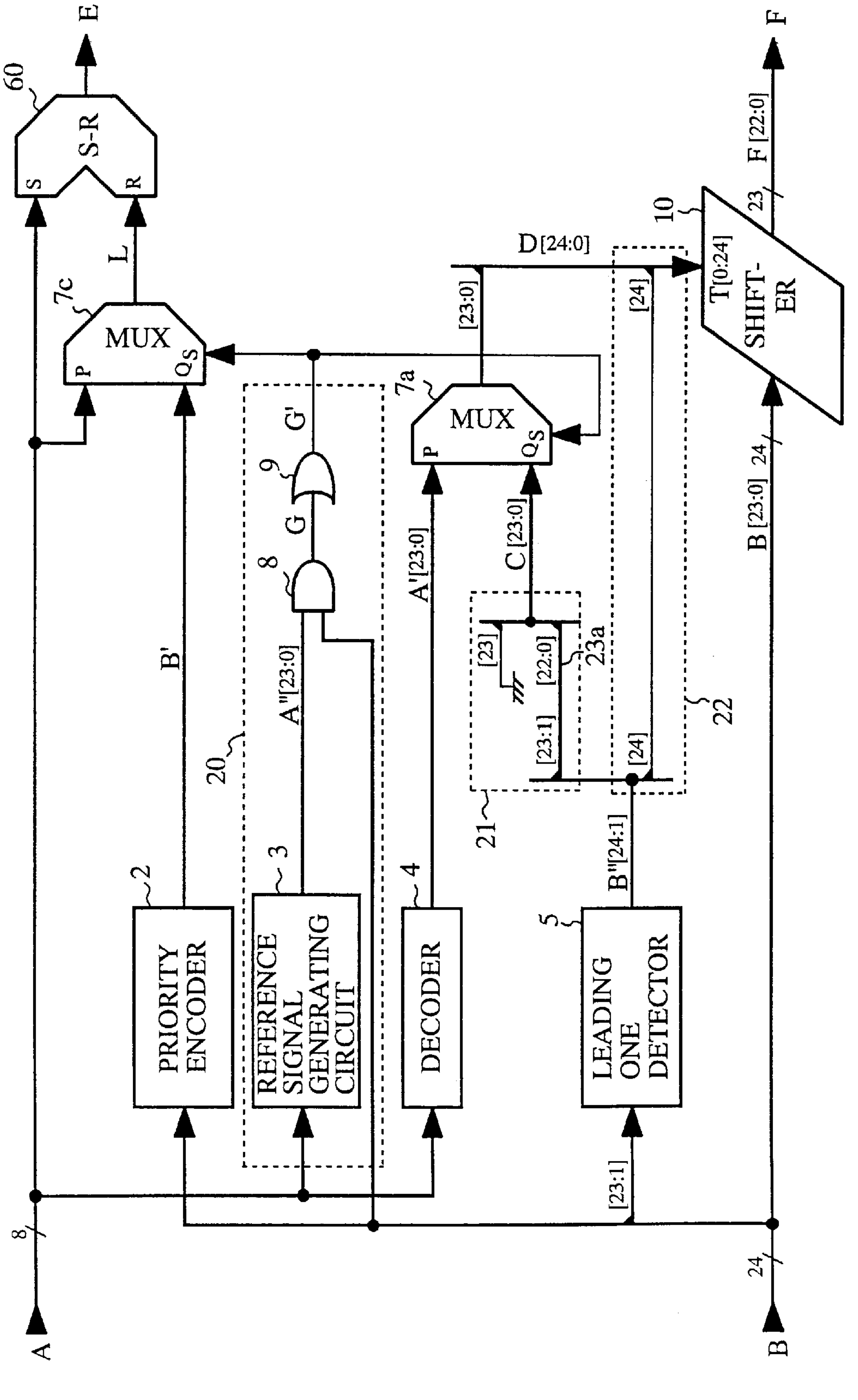
FIG. 12 is a block diagram showing the structure of normalization circuitry according to a second embodiment of the present invention.

Referring now to FIG. 12, there is illustrated a block diagram showing the structure of normalization circuitry according to a second embodiment of the present invention for use in floating point computation devices. In FIG. 12, reference numeral 2 denotes a priority encoder, 3 denotes a reference signal generating circuit, 4 denotes a decoder, 5 denotes a leading one detector, 60 denotes a subtracter, 7*a* denotes a first multiplexer (MUX) circuit, 7*c* denotes a second MUX circuit, 8 denotes an AND gate, 9 denotes an OR gate, 10 denotes a shifter, 21 denotes a one-bit right shifter for shifting a binary number applied thereto one bit position to the right, and 20 denotes a selecting signal generating unit.

In FIG. 12, reference character A denotes an input binary number, i.e., an input signal representing the exponent part of a floating point number to be processed by the normalization circuitry of this embodiment, B denotes another input binary number, i.e., another input signal representing the mantissa part of the floating point number to be processed by the normalization circuitry of this embodiment, and E denotes an output binary number, i.e., an output signal representing the exponent part of the floating point number processed by the normalization circuitry, e.g., normalized, unnormalized, or on which the zero function is performed. Furthermore, reference numeral D denotes a binary number, i.e., a control signal representing a shift amount for normalizing the input signal B representing the mantissa part of the floating point number to be processed, and F denotes another output binary number, i.e., another output signal representing the mantissa part of the floating point number processed by the normalization circuitry of this embodiment. In addition, each notation [n:m] shown aside each character showing each signal in FIG. 12 indicates that a corresponding binary number is comprised of (n−m+1) bits from bit m to bit n.

The normalization circuitry of the second embodiment shown in the figure is so constructed as to receive an 8-bit input signal A representing the exponent part of a floating point number to be processed and a 24-bit input signal B representing the mantissa part of the floating point number, furnish an 8-bit output signal E representing the exponent part of the floating point number processed by this circuitry and a 23-bit output signal F representing the mantissa part of the floating point number processed by this circuitry, and generate a 25-bit control signal D representing a shift amount.

The decoder 4, leading one detector 5, priority encoder 2, reference signal generating circuit 3, subtracter 60, first and second MUX circuits 7*a* and 7*c*, and shifter 10 have the same structures as those of the normalization circuitry of the first embodiment mentioned above, respectively.

Next, a description will be made as to the operation of the normalization circuitry of this embodiment. Consider that the value of the input signal A representing the exponent part of a floating point number to be processed is 127 in decimal and the binary value of the input signal B representing the mantissa part of the floating point number is 0000 0001 0001 0001 0001 0001. This is an example of normalization. The normalization circuitry carries out normalization for the floating point number applied thereto as follows:

(1) The reference signal generating circuit 3 generates an output signal A" having a binary value of 1111 1111 1111 1111 1111 1111, as shown in FIG. 7, because the value of the input signal A is greater than 24 in decimal.

(2) The AND gate 8 then delivers an output signal G having a binary value of 0000 0001 0001 0001 0001 0001.

(3) The OR gate 9 computes the logical OR of all the bits of the output signal G from the AND gate 8 and then furnishes an output signal G' at logic 1.

(4) When the priority encoder 2 receives the input signal B representing the mantissa part of the floating point number to be normalized, it delivers an output signal B' having a decimal value of 7 (i.e., a binary value of 00111) to the MUX circuit 7*c*.

(5) The MUX circuit 7*c* then selects the signal B' having a value of 7 from the priority encoder 2 applied thereto via its second input terminal Q as its output signal L in response to the selecting signal G' at logic 1 from the OR gate 9.

(6) The subtracter 60 subtracts the value of the signal L from the MUX circuit 7*c* from the value of the input signal A and then generates an output signal E having a value which is equal to the subtraction result (127−7)=120.

(7) When the decoder 4 receives the input signal A, it generates an output signal A' having a binary value of 0000 0000 0000 0000 0000 0000 according to the truth table shown in FIG. 2.

(8) When the leading one detector 5 receives all the bits of the input signal B except the least significant bit $B_0$, it generates an output signal B" having a binary value of 0 0000 0001 0000 0000 0000 000 according to the truth table shown in FIG. 4.

(9) The one-bit right shifter 21 shifts all the bits of the signal B" except the most significant bit $B''_{24}$ one bit position to the right and then delivers an output signal C having a binary value of 0000 0000 1000 0000 0000 0000 to the MUX circuit 7*a*.

(10) The MUX circuit 7*a* then selects and delivers the signal C from the one-bit right shifter 21 applied thereto via its second terminal Q to the shifter 10 as bits $D_{23}$ through $D_0$ of the control signal in response to the selecting signal G' at logic 1 from the OR gate 9. Furthermore, the most significant bit $B''_{24}$ of the signal B" is delivered to the shifter 10 as the most significant bit $D_{24}$ of the control signal as well. The binary value of the control signal applied to the shifter 10 is thus given as 0 0000 0000 1000 0000 0000 0000.

(11) Te shifter 10 then shifts the input signal B according to the value of the control signal D applied thereto and then generates an output signal F having a binary value of 000 1000 1000 1000 1000 0000.

Next, consider that the value of the input signal A representing the exponent part of a floating point number to be processed is 5 in decimal and the binary value of the input signal B representing the mantissa part of the floating point number to be processed is 0000 0001 0001 0001 0001 0001. This is an example of unnormalization. The normalization circuitry carries out unnormalization for the floating point number applied thereto as follows:

(1) The reference signal generating circuit 3 generates an output signal A" having a binary value of 1111 1000 0000 0000 0000 0000 according to the truth table shown in FIG. 7.

(2) The AND gate 8 then delivers an output signal G having a binary value of 0000 0000 0000 0000 0000 0000.

(3) The OR gate 9 computes the logical OR of all the bits of the output signal G from the AND gate 8 and then furnishes an output signal G' at logic 0.

(4) When the priority encoder 2 receives the input signal B representing the mantissa part of the floating point number to be unnormalized, it delivers an output signal B' having a decimal value of 7 (i.e., a binary value of 00111) to the MUX circuit 7*c*.

(5) The MUX circuit 7*c* then selects the input signal A applied thereto via its first input terminal P as its output signal L in response to the selecting signal G' at logic 0 from the OR gate 9.

(6) The subtracter 60 subtracts the value of the signal L from the MUX circuit 7*c* from the value of the input signal A and then generates an output signal E having a value which is equal to the subtraction result (5−5)=0.

(7) When the decoder 4 receives the input signal A, it generates an output signal A' having a binary value of 0000 0100 0000 0000 0000 0000 according to the truth table shown in FIG. 2.

(8) When the leading one detector 5 receives all the bits of the input signal B except the least significant bit $B_0$, it generates an output signal B" having a binary value of 0 0000 0001 0000 0000 0000 000 according to the truth table shown in FIG. 4.

(9) The one-bit right shifter 21 shifts all the bits of the signal B" except the most significant bit $B''_{24}$ one bit position to the right and then delivers an output signal C having a binary value of 0000 0000 1000 0000 0000 0000 to the MUX circuit 7*a*.

(10) The MUX circuit 7*a* then selects and delivers the signal A' from the decoder 4 applied thereto via its first terminal P to the shifter 10 as bits $D_{23}$ through $D_0$ of the control signal D in response to the selecting signal G' at logic 0 from the OR gate 9. The most significant bit $B''_{24}$ is delivered to the shifter 10 as the most significant bit $D_{24}$ of the control signal D as well. The binary value of the control signal D is thus given as 0 0000 0100 0000 0000 0000 0000.

(11) The shifter 10 shifts the input signal B according to the value of the control signal D applied thereto and then generates an output signal F having a binary value of 001 0001 0001 0001 00010 0000.

Next, consider that the value of the input signal A representing the exponent part of a floating point number to be processed is 7 in decimal and the binary value of the input signal B representing the mantissa part of the floating point number to be processed is 0000 0001 0001 0001 0001 0001. This is another example of unnormalization. The normalization circuitry carries out unnormalization for the floating point number applied thereto as follows:

(1) The reference signal generating circuit 3 generates an output signal A" having a binary value of 1111 1110 0000 0000 0000 0000 according to the truth table shown in FIG. 7.

(2) The AND gate 8 then delivers an output signal G having a binary value of 0000 0000 0000 0000 0000 0000.

(3) The OR gate 9 computes the logical OR of all the bits of the output signal G from the AND gate 8 and therefore furnishes an output signal G' at logic 0.

(4) When the priority encoder 2 receives the input signal B representing the mantissa part of the floating point number to be unnormalized, it delivers an output signal B' having a decimal value of 7 (i.e., a binary value of 00111) to the MUX circuit 7*c*.

(5) The MUX circuit 7*c* then selects the input signal A applied thereto via its first input terminal P as its output signal L in response to the selecting signal G' at logic 0 from the OR gate 9.

(6) The subtracter 60 subtracts the value of the signal L from the MUX circuit 7*c* from the value of the input signal A and then generates an output signal E having a value which is equal to the subtraction result (7−7)=0.

(7) When the decoder 4 receives the input signal A, it generates the output signal A' having a binary value of 0000 0001 0000 0000 0000 0000 according to the truth table shown in FIG. 2.

(8) When the leading one detector 5 receives all the bits of the input signal B except the least significant bit $B_0$, it generates an output signal B" having a binary value of 0 0000 0001 0000 0000 0000 000 according to the truth table shown in FIG. 4.

(9) The one-bit right shifter 21 shifts all the bits of the signal B" except the most significant bit $B''_{24}$ one bit position to the right and then delivers an output signal C having a binary value of 0000 0000 1000 0000 0000 0000 to the MUX circuit 7*a*.

(10) The MUX circuit 7*a* then selects and delivers the signal A' from the decoder 4 applied thereto via its first terminal P to the shifter 10 as bits $D_{23}$ through $D_0$ of the control signal D in response to the selecting signal G' at logic 0 from the OR gate 9. The most significant bit $B''_{24}$ is delivered to the shifter 10 as the most significant bit $D_{24}$ of the control signal D as well. The binary value of the control signal D is thus given as 0 0000 0001 0000 0000 0000 0000.

(11) When the shifter 10 receives the input signal B, it shifts the input signal B according to the value of the control signal D applied thereto by way of its control terminal T and then generates the output signal F having a binary value of 100 0100 0100 0100 0100 0000.

Consider that the value of the input signal A representing the exponent part of a floating point number to be processed is 127 in decimal and the binary value of the input signal B representing the mantissa part of the floating point number is 0000 0000 0000 0000 0000 0000. This is an example of the zero function. The normalization circuitry carries out the zero function for the floating point number applied thereto as follows:

(1) The reference signal generating circuit 3 generates an output signal A" having a binary value of 1111 1111 1111 1111 1111 1111 according to the truth table shown in FIG. 7.

(2) The AND gate 8 then delivers an output signal G having a binary value of 0000 0000 0000 0000 0000 0000.

(3) The OR gate 9 computes the logical OR of all the bits of the output signal G from the AND gate 8 and therefore furnishes an output signal G' at logic 0.

(4) When the priority encoder 2 receives the input signal B representing the mantissa part of the floating point number on which the zero function is to be performed, it delivers an output signal B' having a decimal value of 0 (i.e., a binary value of 00000) to the MUX circuit 7*c*.

(5) The MUX circuit 7*c* then selects the input signal A applied thereto via its first input terminal P as its output signal L in response to the selecting signal G' at logic 0 from the OR gate 9.

(6) The subtracter 60 subtracts the value of the signal L from the MUX circuit 7*c* from the value of the input signal A and then generates an output signal E having a value which is equal to the subtraction result (127−127)=0.

(7) When the decoder 4 receives the input signal A, it generates an output signal A' having a binary value of 0000 0000 0000 0000 0000 0000 according to the truth table shown in FIG. 2.

(8) When the leading one detector 5 receives all the bits of the input signal B except the least significant bit $B_0$, it generates an output signal B" having a binary value of 1 0000 0000 0000 0000 0000 000 according to the truth table shown in FIG. 4.

(9) The one-bit right shifter 21 shifts all the bits of the signal B" except the most significant bit $B''_{24}$ one bit position to the right and then delivers an output signal C having a binary value of 0000 0000 0000 0000 0000 0000 to the MUX circuit 7*a*.

(10) The MUX circuit 7*a* then selects and delivers the signal A' from the decoder 4 applied thereto via its first terminal P to the shifter 10 as bits $D_{23}$ through $D_0$ of the control signal D in response to the selecting signal G' at logic 0 from the OR gate 9. The most significant bit $B''_{24}$ of the signal B" from the leading one detector 5 is delivered to the shifter 10 as the most significant bit $D_{24}$ of the control signal D as well. The binary value of the control signal D is thus given as 1 0000 0000 0000 0000 0000 0000.

(11) The shifter 10 shifts the input signal B according to the value of the control signal D applied thereto and then generates an output signal F having a binary value of 000 0000 0000 0000 0000 0000.

Third Embodiment

Figure 13:
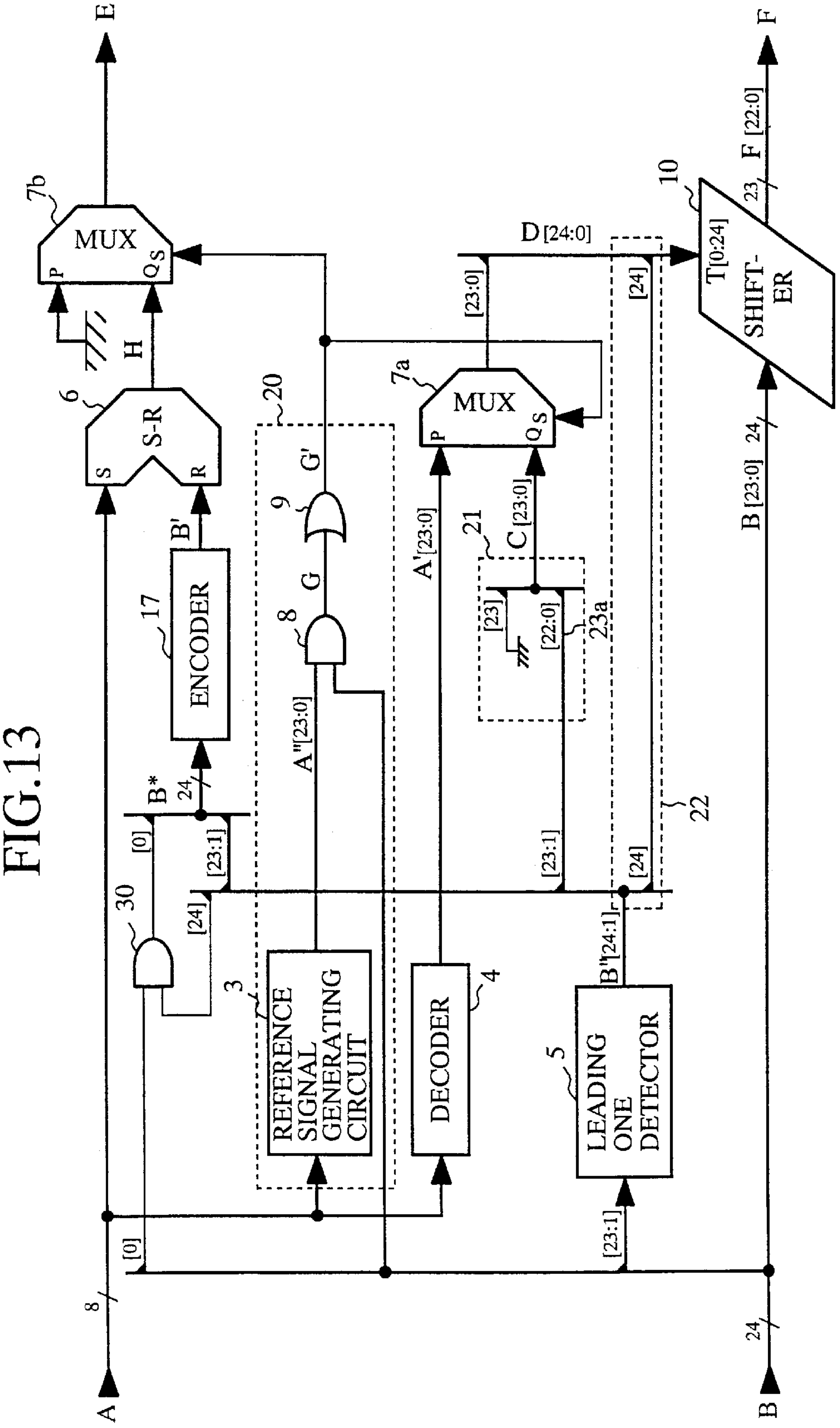
FIG. 13 is a block diagram showing the structure of normalization circuitry according to a third embodiment of the present invention.

Referring now to FIG. 13, there is illustrated a block diagram showing the structure of normalization circuitry according to a third embodiment of the present invention for use in floating point computation devices. In FIG. 13, reference numeral 17 denotes an encoder, 3 denotes a reference signal generating circuit, 4 denotes a decoder, 5 denotes a leading one detector, 6 denotes a subtracter, 7*a* denotes a first multiplexer (MUX) circuit, 7*b* denotes a second MUX circuit, 8 denotes a first AND gate, 9 denotes an OR gate, 10 denotes a shifter, 21 denotes a one-bit right shifter for shifting a binary number applied thereto one bit position to the right, 20 denotes a selecting signal generating unit, and 30 denotes a second AND gate.

In FIG. 13, reference character A denotes an input binary number, i.e., an input signal representing the exponent part of a floating point number to be processed by the normalization circuitry of this embodiment, B denotes another input binary number, i.e., another input signal representing the mantissa part of the floating point number to be processed by the normalization circuitry of this embodiment, and E denotes an output binary number, i.e., an output signal representing the exponent part of the floating point number processed by the normalization circuitry, e.g., normalized, unnormalized, or on which the zero function is performed. Furthermore, reference numeral D denotes a binary number, i.e., a control signal representing a shift amount for normalizing the input signal B representing the mantissa part of the floating point number to be processed, and F denotes another output binary number, i.e., another output signal representing the mantissa part of the floating point number processed by the normalization circuitry of this embodiment. In addition, each notation [n:m] shown aside each character showing each signal in FIG. 13 indicates that a corresponding binary number is comprised of (n−m+1) bits from bit m to bit n.

The normalization circuitry of the third embodiment shown in the figure is so constructed as to receive an 8-bit input signal A representing the exponent part of a floating point number to be processed and a 24-bit input signal B representing the mantissa part of the floating point number, furnish an 8-bit output signal E representing the exponent part of the floating point number processed by this circuitry and a 23-bit output signal F representing the mantissa part of the floating point number processed by this circuitry, and generate a 25-bit control signal D representing a shift amount.

The decoder 4, leading one detector 5, reference signal generating circuit 3, subtracter 6, first and second MUX circuits 7*a* and 7*b*, and shifter 10 have the same structures as those of the normalization circuitry of the first embodiment mentioned above, respectively. The operations of these components are the same as those of the same components of the first embodiment and therefore the description about the operations will be omitted hereinafter.

Figure 15:
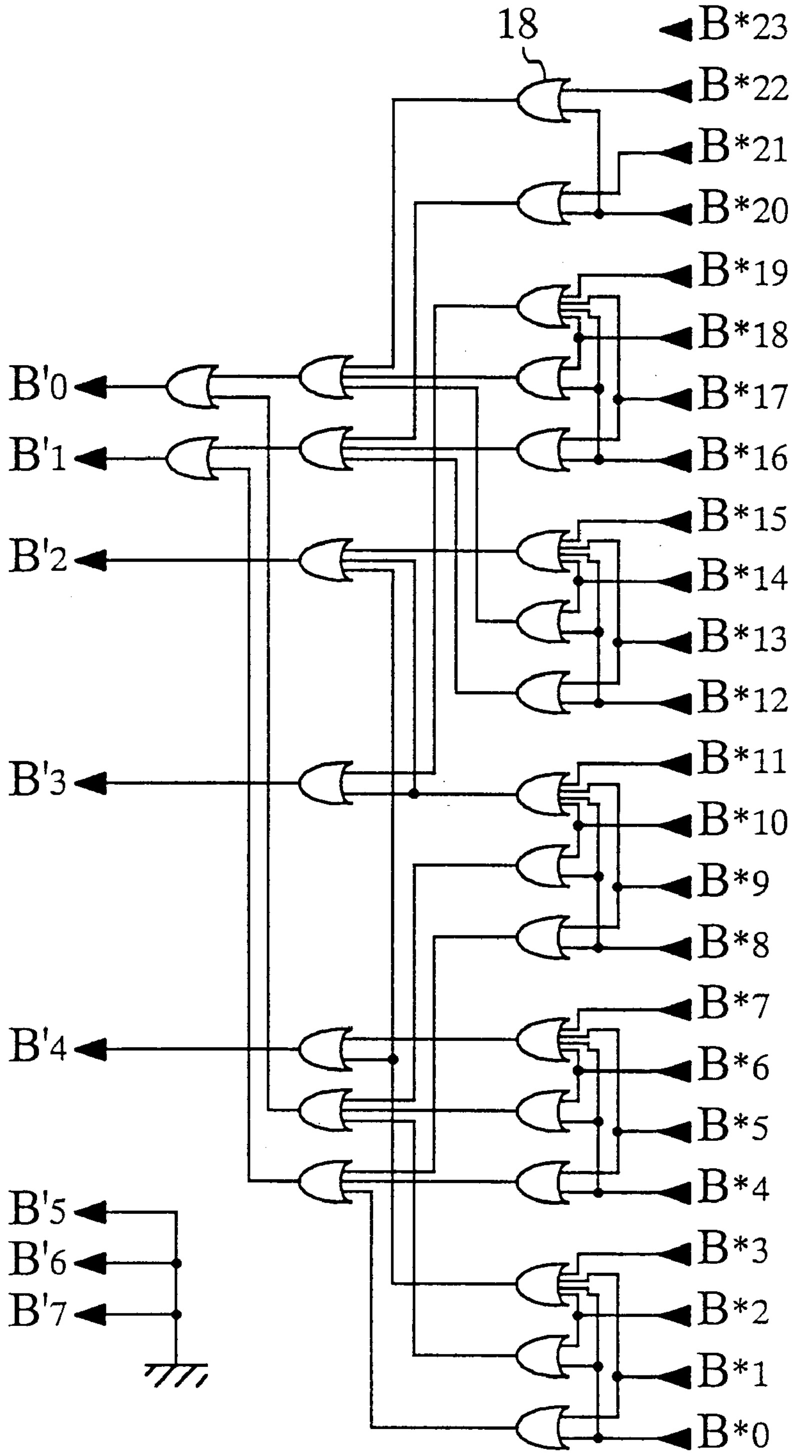
FIG. 15 is a schematic circuit diagram of the encoder.

In operation, the second AND gate 30 computes the logical AND of the least significant bit $B_0$ of the second input signal B with the most significant bit $B''_{24}$ of the signal B" from the leading one detector 5. The encoder 17 then determines whether each bit of a binary input number B* comprised of all the bits of the signal B" except the most significant bit $B''_{24}$ from the leading one detector 5 and the output of the second AND gate 30 as its least significant bit is 1 or 0 while searching through all the bits of the binary word B* from its most significant bit so as to detect the bit position of the leading 1 of the binary word B* and then subtract 1 from the number showing the bit position of the leading 1 counted from the most significant bit. The encoder 17 then generates a signal B' having a binary value which corresponds to the subtraction result. The bit width of the output signal B' in the case where the binary number B* applied to the encoder 17 is n bits long is $\{int(log_2(n-1))+1\}$ bits. Accordingly, when the digital signal B* applied to the encoder 17 is of 24 bits, the bit width of the output signal B' is 5 bits. FIG. 14 shows the truth table of the encoder 17. Furthermore, FIG. 15 is a schematic circuit diagram of an example of the encoder 17.

Figure 16:
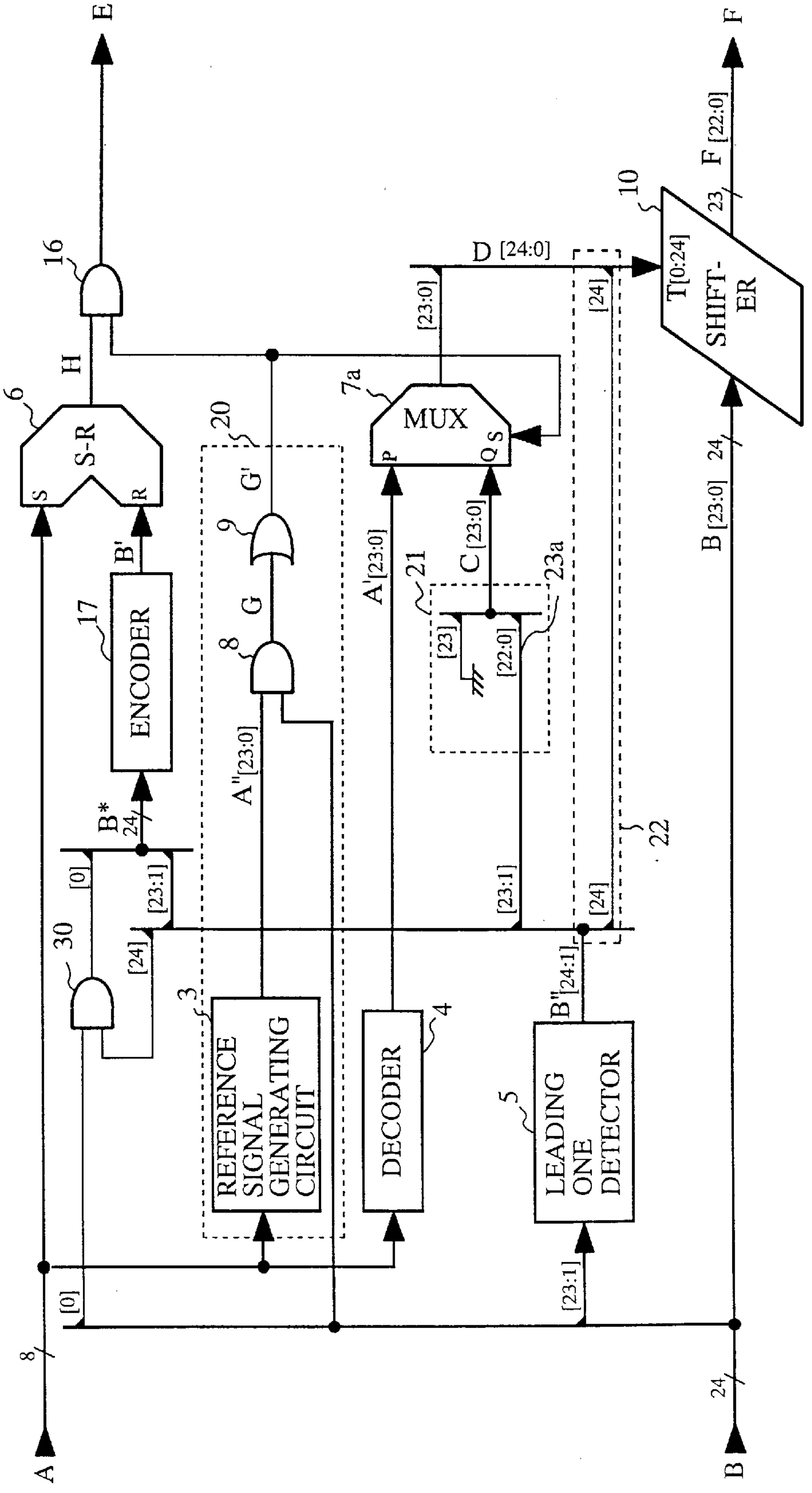
FIG. 16 is a block diagram showing the structure of a variant of the third embodiment in which a multiplexer circuit is replaced by an AND gate.

Referring next to FIG. 16, there is illustrated a schematic circuit diagram of a variant of the third embodiment of the present invention. In this variant, there is provided another two-input AND gate 16 having a first input terminal connected the output terminal (S-R) of the subtracter 6 and a second input terminal connected to the output terminal of the OR gate 9 instead of the MUX circuit 7*b* shown in FIG. 13, as shown in FIG. 16. The output signal E showing the mantissa part goes logic 0 when the signal G' from the OR gate is at logic 0, otherwise the output signal H from the subtracter 6 is delivered as the output signal E.

Fourth Embodiment

Figure 17:
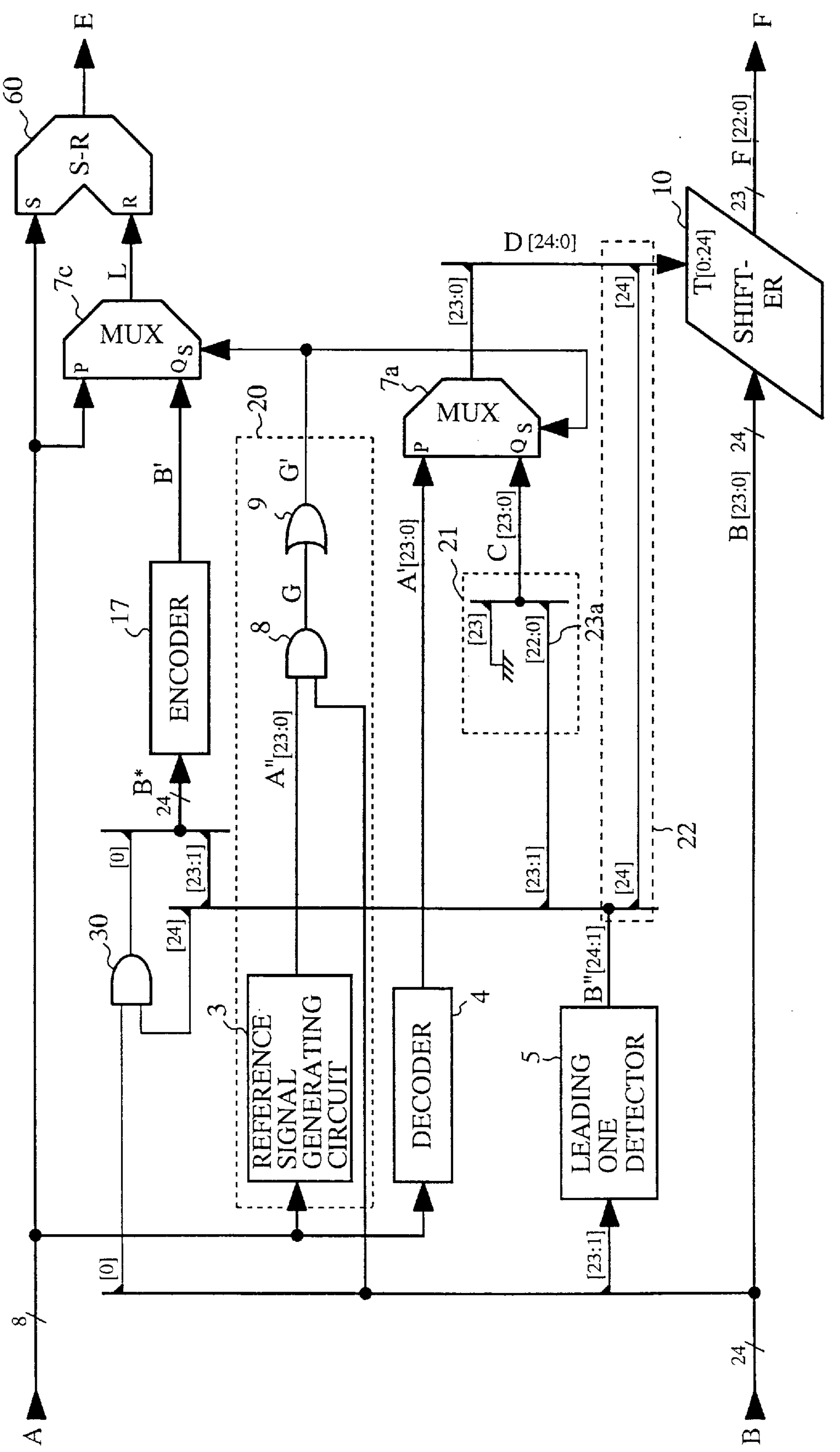
FIG. 17 is a block diagram showing the structure of normalization circuitry according to a fourth embodiment of the present invention.

Referring now to FIG. 17, there is illustrated a block diagram showing the structure of normalization circuitry according to a fourth embodiment of the present invention for use in floating point computation devices. In FIG. 17, reference numeral 17 denotes an encoder, 3 denotes a reference signal generating circuit, 4 denotes a decoder, 5 denotes a leading one detector, 6 denotes a subtracter, 7*a* denotes a first MUX circuit, 7*c* denotes a second MUX circuit, 8 denotes a first AND gate, 9 denotes an OR gate, 10 denotes a shifter, 21 denotes a one-bit right shifter for shifting a parallel binary word applied thereto one bit position to the right, 20 denotes a selecting signal generating unit, and 30 denotes a second AND gate.

In FIG. 17, reference character A denotes an input binary number, i.e., an input signal representing the exponent part of a floating point number to be processed by the normalization circuitry of this embodiment, B denotes another input binary number, i.e., another input signal representing the mantissa part of the floating point number to be processed by the normalization circuitry of this embodiment, and E denotes an output binary number, i.e., an output signal representing the exponent part of the floating point number processed by the normalization circuitry, e.g., normalized, unnormalized, or on which the zero function is performed. Furthermore, reference numeral D denotes a binary number, i.e., a control signal representing a shift amount for normalizing the input signal B representing the mantissa part of the floating point number to be processed, and F denotes another output binary number, i.e., another output signal representing the mantissa part of the floating point number processed by the normalization circuitry of this embodiment. In addition, each notation [n:m] shown aside each character showing each signal in FIG. 17 indicates that a corresponding binary number is comprised of (n−m+1) bits from bit m to bit n.

The normalization circuitry of the fourth embodiment shown in the figure is so constructed as to receive an 8-bit input signal A representing the exponent part of a floating point number to be processed and a 24-bit input signal B representing the mantissa part of the floating point number, furnish an 8-bit output signal E representing the exponent part of the floating point number processed by this circuitry and a 23-bit output signal F representing the mantissa part of the floating point number processed by this circuitry, and generate a 25-bit signal D representing a shift amount.

The decoder 4, leading one detector 5, reference signal generating circuit 3, subtracter 6, first and second MUX circuits 7*a* and 7*c*, and shifter 10 have the same structures as those of the normalization circuitry of the second embodiment mentioned above, respectively. Furthermore, the encoder 17 has the same structure as that of the third embodiment. Accordingly, the description about the operation of the normalization circuitry of the fourth embodiment will be omitted hereinafter.

Fifth Embodiment

Figure 18:
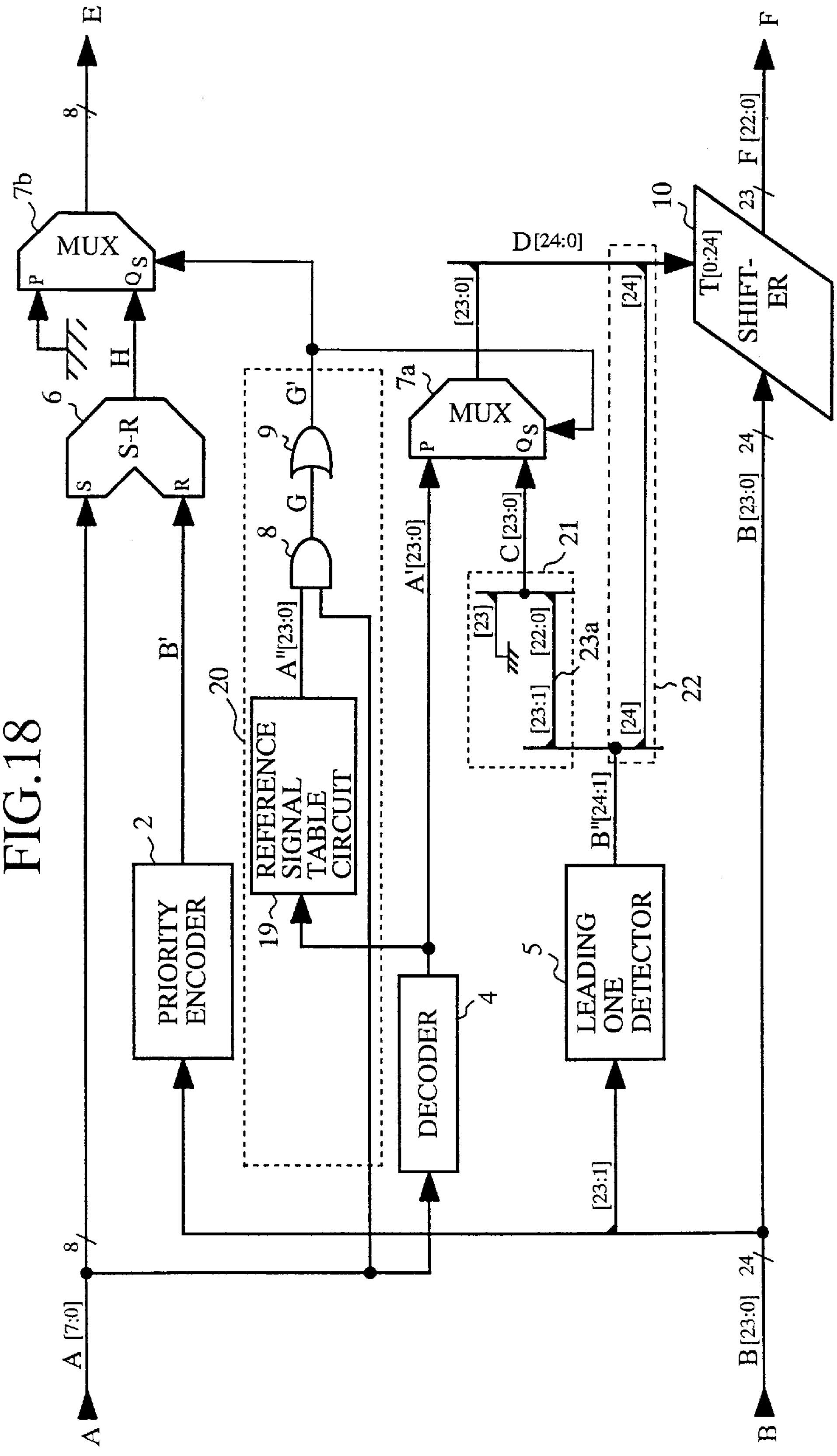
FIG. 18 is a block diagram showing the structure of normalization circuitry according to a fifth embodiment of the present invention.

Referring now to FIG. 18, there is illustrated a block diagram showing the structure of normalization circuitry according to a fifth embodiment of the present invention for use in floating point computation devices. In FIG. 18, reference numeral 2 denotes a priority encoder, 19 denotes a reference signal table circuit for generating a reference signal from the output of a decoder 4, 5 denotes a leading one detector, 6 denotes a subtracter, 7*a* denotes a first MUX circuit, 7*b* denotes a second MUX circuit, 8 denotes an AND gate, 9 denotes an OR gate, 10 denotes a shifter, 21 denotes a one-bit right shifter for shifting a binary word applied thereto one bit position to the right, and 20 denotes a selecting signal generating unit.

In FIG. 18, reference character A denotes an input binary number, i.e., an input signal representing the exponent part of a floating point number to be processed by the normalization circuitry of this embodiment, B denotes another input binary number, i.e., another input signal representing the mantissa part of the floating point number to be processed by the normalization circuitry of this embodiment, and E denotes an output binary number, i.e., an output signal representing the exponent part of the floating point number processed by the normalization circuitry, e.g., normalized, unnormalized, or on which the zero function is performed. Furthermore, reference numeral D denotes a binary number, i.e., a control signal representing a shift amount for normalizing the input signal B representing the mantissa part of the floating point number to be processed, and F denotes another output binary number, i.e., another output signal representing the mantissa part of the floating point number processed by the normalization circuitry of this embodiment. In addition, each notation [n:m] shown aside each character showing each signal in FIG. 18 indicates that a corresponding binary number is comprised of (n−m+1) bits from bit m to bit n.

The normalization circuitry of the fifth embodiment shown in the figure is so constructed as to receive an 8-bit input signal A representing the exponent part of a floating point number to be processed and a 24-bit input signal B representing the mantissa part of the floating point number, furnish an 8-bit output signal E representing the exponent part of the floating point number processed by this circuitry and a 23-bit output signal F representing the mantissa part of the floating point number processed by this circuitry, and generate a 25-bit control signal D representing a shift amount.

The decoder 4, leading one detector 5, priority encoder 2, subtracter 6, first and second MUX circuits 7*a* and 7*b*, and shifter 10 have the same structures as those of the normalization circuitry of the first embodiment mentioned above, respectively. The operations of these components are the same as those of the same components of the first embodiment and therefore the description about the operations will be omitted hereinafter.

Figure 20:
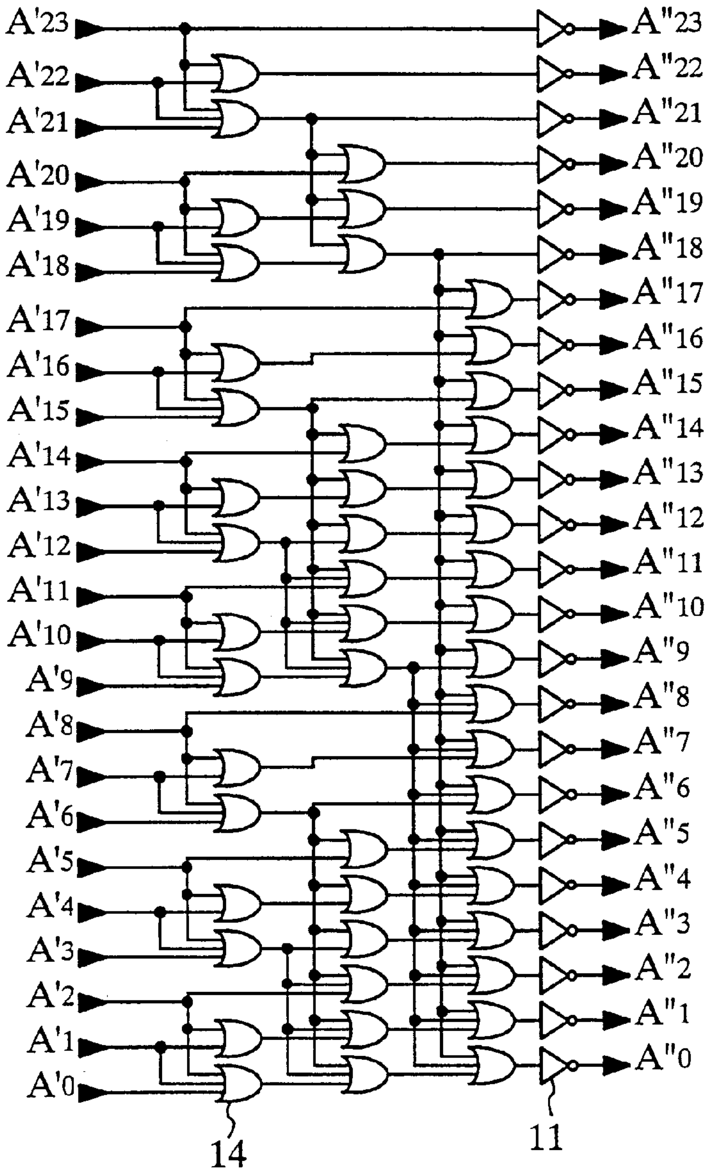
FIG. 20 is a schematic circuit diagram of the reference signal table circuit.

In operation, the reference signal table circuit 19 generates a reference signal A" from the signal A' into which the input signal A representing a binary number has been decoded by the decoder 4. The reference signal table circuit 19 sets to 1 the states of only one or more highmost bits of its output signal A" which are located just above the bit position of the leading one of the binary input signal A' if the most significant bit of the signal A' is 0. When the most significant bit of the input signal A' is 1, the reference signal table circuit 19 generates an output signal A" all the bits of which are set to 0. Furthermore, when the values of all the bits of the input signal A' are 0, the reference signal table circuit 19 generates an output signal A" all the bits of which are set to 1. FIG. 19 shows the truth table of the reference signal table circuit 19 which generates the reference signal A" from the signal A' from the decoder 4. Furthermore, FIG. 20 shows an example of the reference signal table circuit 19. In FIG. 20, reference numeral 14 denotes an OR gate.

Figure 21:
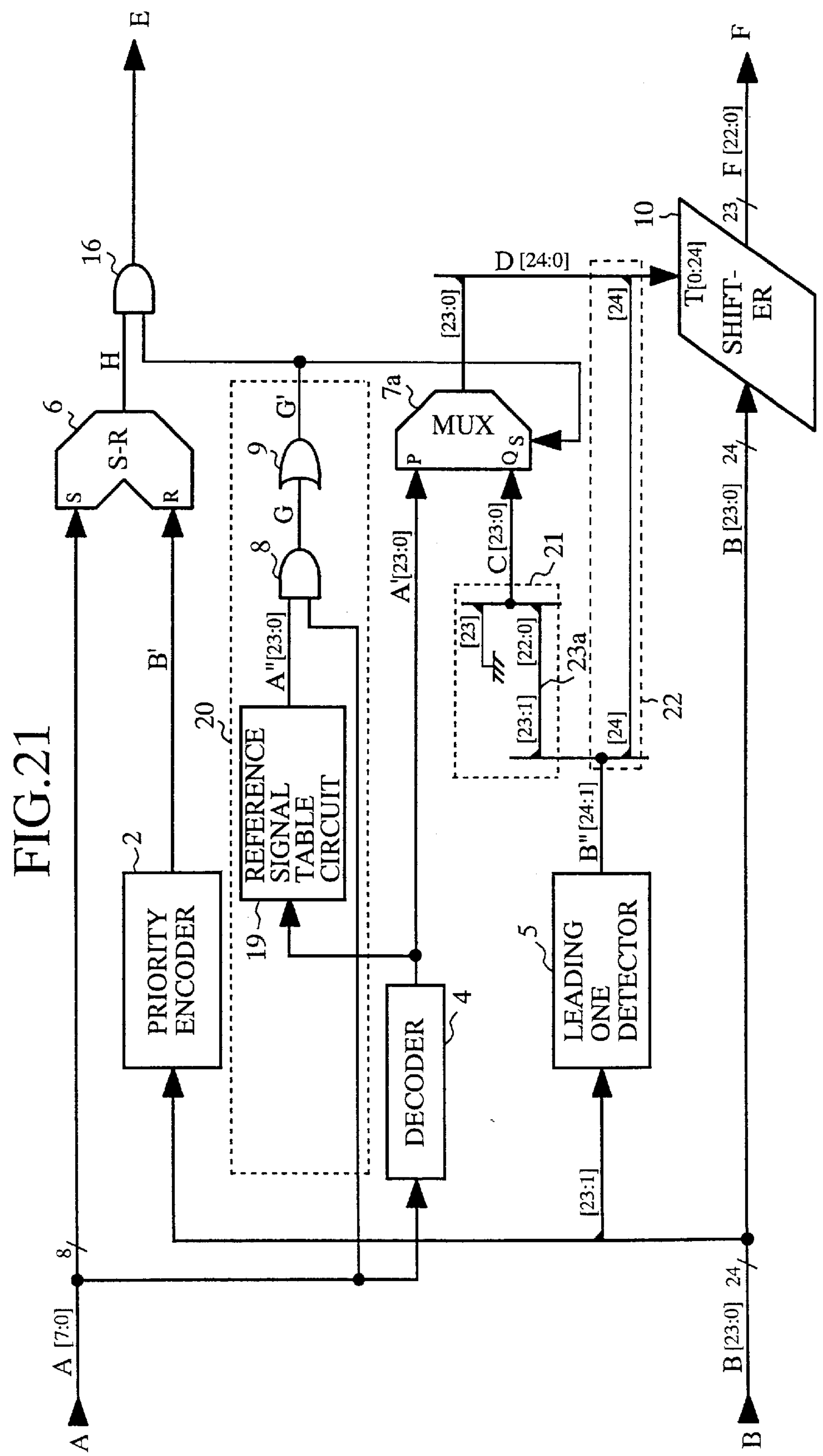
FIG. 21 is a block diagram showing the structure of a variant of the fifth embodiment in which a multiplexer circuit is replaced by an AND gate.

Referring next to FIG. 21, there is illustrated a block diagram of a variant of the fifth embodiment of the present invention. In this variant, there is provided another two-input AND gate 16 having a first input terminal connected the output terminal (S-R) of the subtracter 6 and a second input terminal connected to the output terminal of the OR gate 9 instead of the MUX circuit 7*b* shown in FIG. 18, as shown in FIG. 21. The output signal E showing the mantissa part goes logic 0 when the signal G' from the OR gate is at logic 0, otherwise the output signal H from the subtracter 6 is delivered as the output signal E.

Sixth Embodiment

Figure 22:
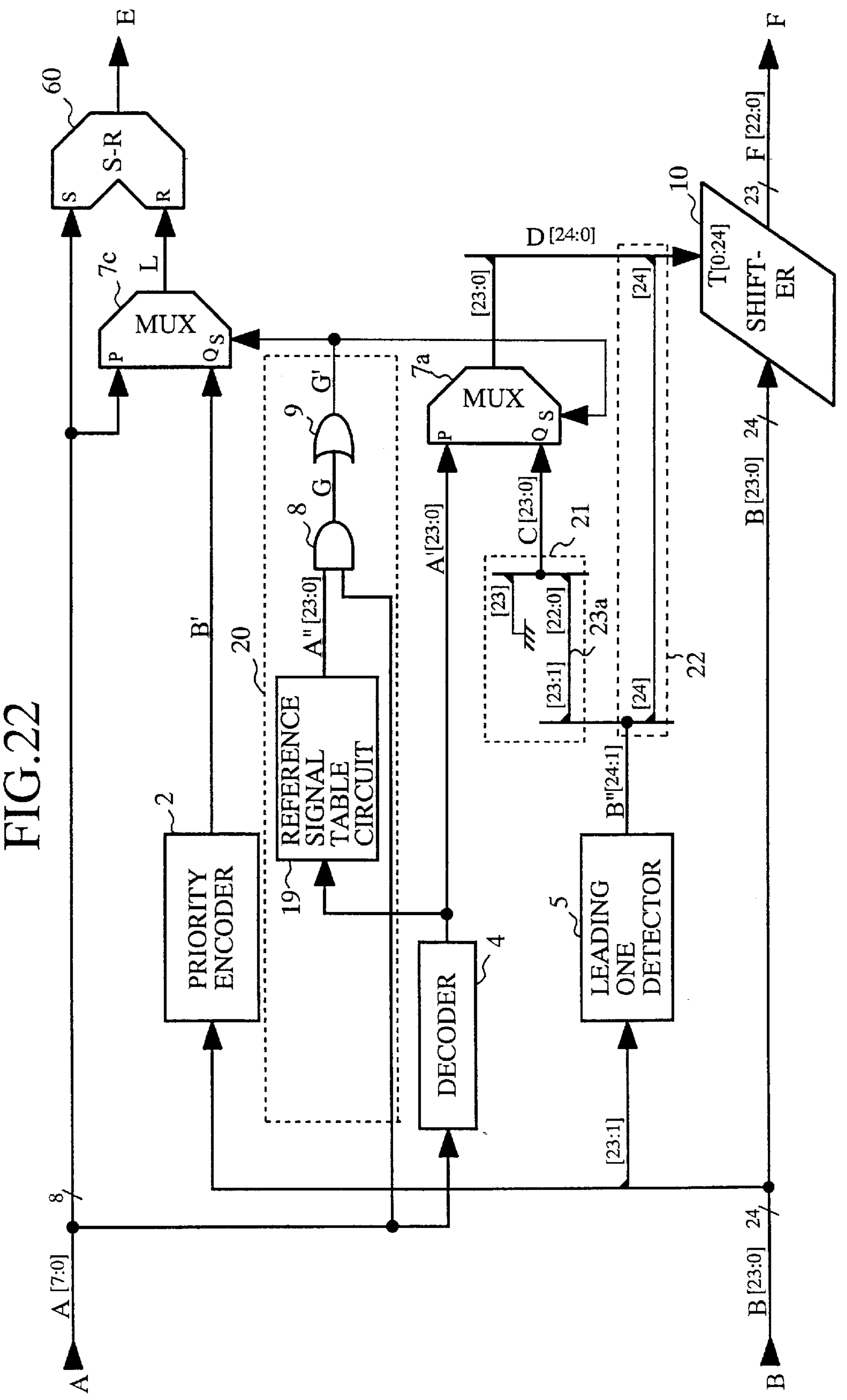
FIG. 22 is a block diagram showing the structure of normalization circuitry according to a sixth embodiment of the present invention.

Referring now to FIG. 22, there is illustrated a block diagram showing the structure of normalization circuitry according to a sixth embodiment of the present invention for use in floating point computation devices. In FIG. 22, reference numeral 2 denotes a priority encoder, 4 denotes a decoder, 19 denotes a reference signal table circuit for generating a reference signal from the output signal A' from the decoder 4, 5 denotes a leading one detector, 60 denotes a subtracter, 7*a* denotes a first MUX circuit, 7*c* denotes a second MUX circuit, 8 denotes an AND gate, 9 denotes an OR gate, 10 denotes a shifter, 21 denotes a one-bit right shifter for shifting a binary word applied thereto one bit position to the right, and 20 denotes a selecting signal generating unit.

In FIG. 22, reference character A denotes an input binary number, i.e., an input signal representing the exponent part of a floating point number to be processed by the normalization circuitry of this embodiment, B denotes another input binary number, i.e., another input signal representing the mantissa part of the floating point number to be processed by the normalization circuitry of this embodiment, and E denotes an output binary number, i.e., an output signal representing the exponent part of the floating point number processed by the normalization circuitry, e.g., normalized, unnormalized, or on which the zero function is performed. Furthermore, reference numeral D denotes a binary number, i.e., a control signal representing a shift amount for normalizing the input signal B representing the mantissa part of the floating point number to be processed, and F denotes another output binary number, i.e., another output signal representing the mantissa part of the floating point number processed by the normalization circuitry of this embodiment. In addition, each notation [n:m] shown aside each character showing each signal in FIG. 22 indicates that a corresponding binary number is comprised of (n−m+1) bits from bit m to bit n.

The normalization circuitry of the sixth embodiment shown in the figure is so constructed as to receive an 8-bit input signal A representing the exponent part of a floating point number to be processed and a 24-bit input signal B representing the mantissa part of the floating point number, furnish an 8-bit output signal E representing the exponent part of the floating point number processed by this circuitry and a 23-bit output signal F representing the mantissa part of the floating point number processed by this circuitry, and generate a 25-bit control signal D representing a shift amount.

The decoder 4, priority encoder 2, leading one detector 5, subtracter 60, first and second MUX circuit 7*a* and 7*c*, and shifter 10 have the same structures as those of the normalization circuitry of the second embodiment mentioned above, respectively. Furthermore, the reference signal table circuit 19 which generates the reference signal from the output signal A' from the decoder 4 has the same structure as that of the fifth embodiment. Accordingly, the description about the operation of the normalization circuitry of the sixth embodiment will be omitted hereinafter.

Seventh Embodiment

Figure 23:
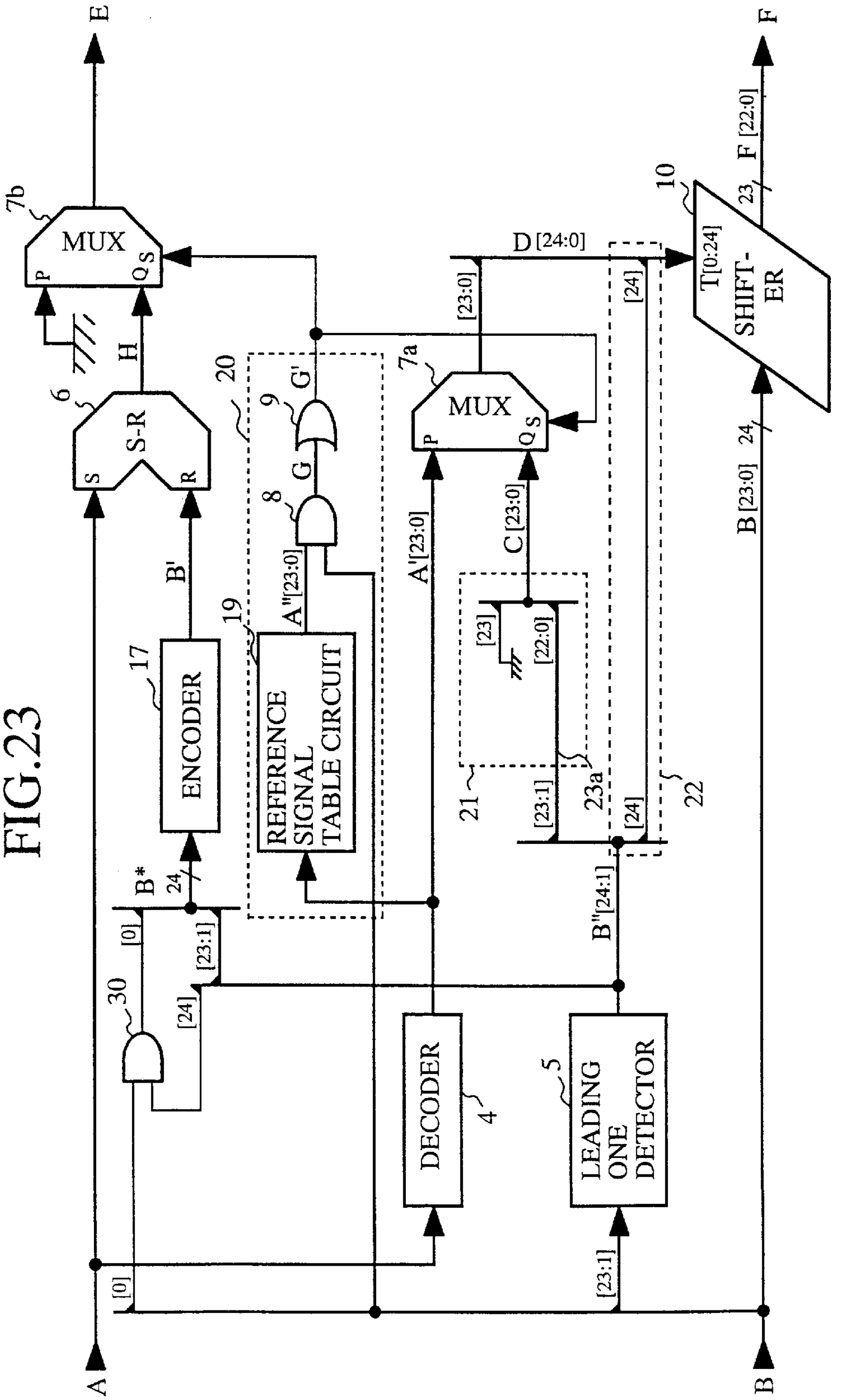
FIG. 23 is a block diagram showing the structure of normalization circuitry according to a seventh embodiment of the present invention.

Referring now to FIG. 23, there is illustrated a block diagram showing the structure of normalization circuitry according to a seventh embodiment of the present invention for use in floating point computation devices. In FIG. 23, reference numeral 17 denotes an encoder, 4 denotes a decoder, 19 denotes a reference signal table circuit for generating a reference signal from an output signal A' furnished by the decoder 4, 5 denotes a leading one detector, 6 denotes a subtracter, 7*a* denotes a first MUX circuit, 7*b* denotes a second MUX circuit, 8 denotes a first AND gate, 9 denotes an OR gate, 10 denotes a shifter, 21 denotes a one-bit right shifter for shifting a binary word applied thereto one bit position to the right, 20 denotes a selecting signal generating unit, and 30 denotes a second AND gate.

In FIG. 23, reference character A denotes an input binary number, i.e., an input signal representing the exponent part of a floating point number to be processed by the normalization circuitry of this embodiment, B denotes another input binary number, i.e., another input signal representing the mantissa part of the floating point number to be processed by the normalization circuitry of this embodiment, and E denotes an output binary number, i.e., an output signal representing the exponent part of the floating point number processed by the normalization circuitry, e.g., normalized, unnormalized, or on which the zero function is performed. Furthermore, reference numeral D denotes a binary number, i.e., a control signal representing a shift amount for normalizing the input signal B representing the mantissa part of the floating point number to be processed, and F denotes another output binary number, i.e., another output signal representing the mantissa part of the floating point number processed by the normalization circuitry of this embodiment. In addition, each notation [n:m] shown aside each character showing each signal in FIG. 23 indicates that a corresponding binary number is comprised of (n−m+1) bits from bit m to bit n.

The normalization circuitry of the seventh embodiment shown in the figure is so constructed as to receive an 8-bit input signal A representing the exponent part of a floating point number to be processed and a 24-bit input signal B representing the mantissa part of the floating point number, furnish an 8-bit output signal E representing the exponent part of the floating point number processed by this circuitry and a 23-bit output signal F representing the mantissa part of the floating point number processed by this circuitry, and generate a 25-bit control signal D representing a shift amount.

The decoder 4, leading one detector 5, subtracter 6, first and second MUX circuits 7*a* and 7*b*, and shifter 10 have the same structures as those of the normalization circuitry of the first embodiment mentioned above, respectively. The encoder 17 has the same structure as that of the normalization circuitry of the third embodiment mentioned above. Furthermore, the reference signal table circuit 19 which generates a reference signal A" from the output signal A' from the decoder 4 has the same structure as that of the normalization circuitry of the fifth embodiment mentioned above. Accordingly, the description about the operation of the normalization circuitry of the seventh embodiment will be omitted hereinafter.

Figure 24:
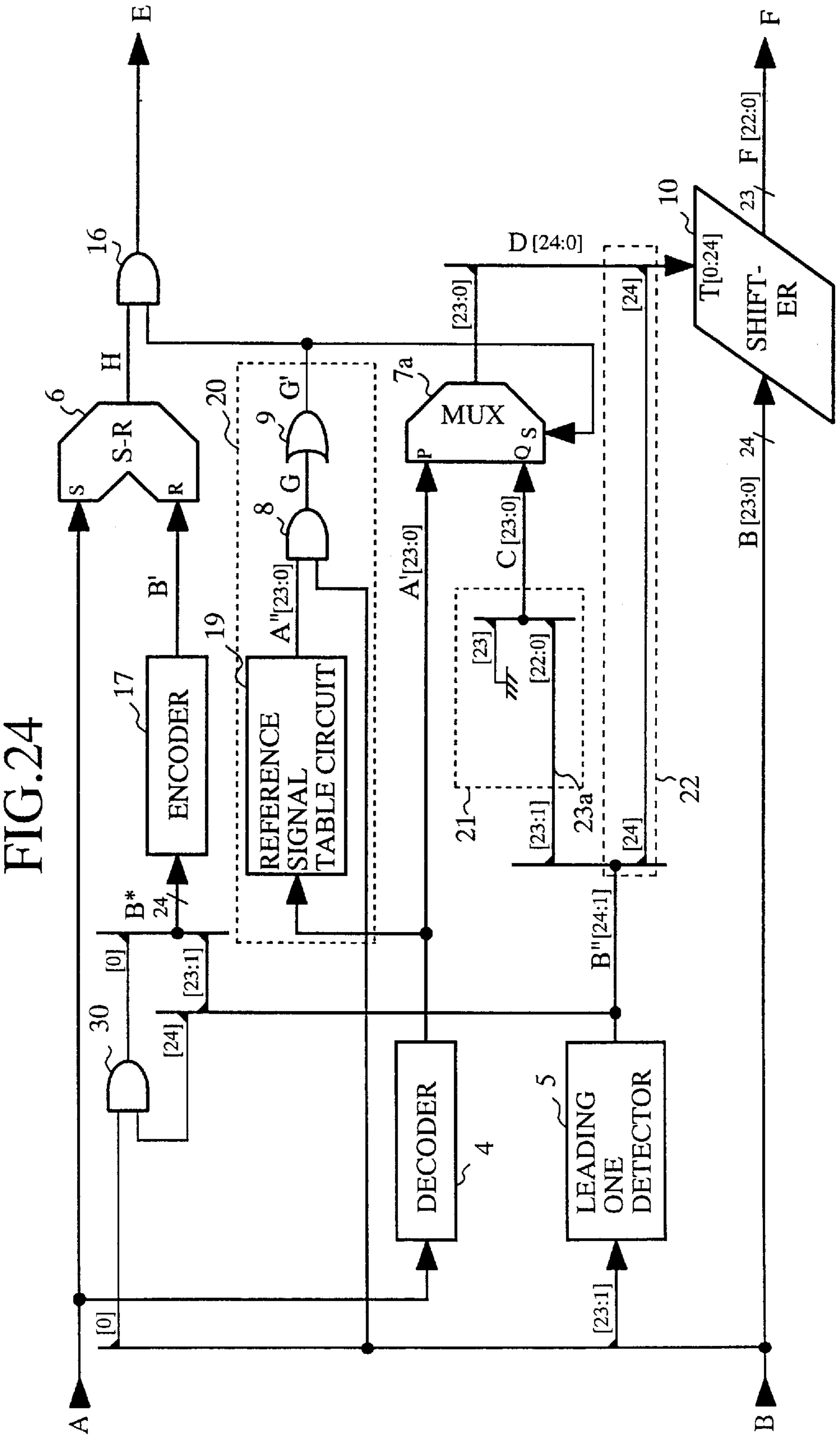
FIG. 24 is a block diagram showing the structure of a variant of the seventh embodiment in which a multiplexer circuit is replaced by an AND gate.

Referring next to FIG. 24, there is illustrated a block diagram of a variant of the seventh embodiment of the present invention. In this variant, there is provided another two-input AND gate 16 having a first input terminal connected the output terminal (S-R) of the subtracter 6 and a second input terminal connected to the output terminal of the OR gate 9 instead of the MUX circuit 7*b* shown in FIG. 23, as shown in FIG. 24. The output signal E showing the mantissa part goes logic 0 when the signal G' from the OR gate is at logic 0, otherwise the output signal H from the subtracter 6 is delivered as the output signal E.

Eighth Embodiment

Figure 25:
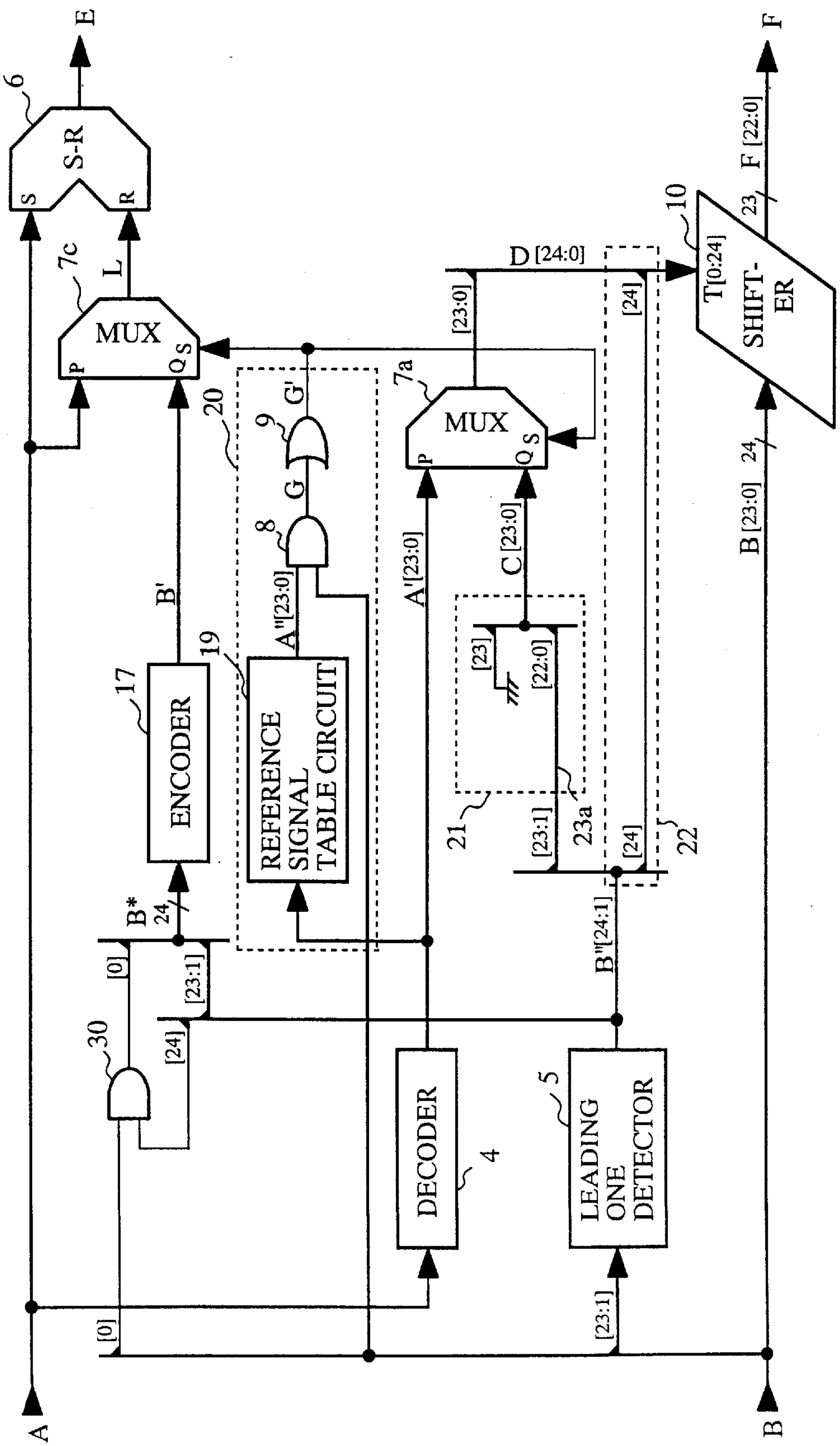
FIG. 25 is a block diagram showing the structure of normalization circuitry according to an eighth embodiment of the present invention.

Referring now to FIG. 25, there is illustrated a block diagram showing the structure of normalization circuitry according to an eighth embodiment of the present invention for use in floating point computation devices. In FIG. 25, reference numeral 17 denotes an encoder, 4 denotes a decoder, 19 denotes a reference signal table circuit for generating a reference signal from an output signal A' furnished by the decoder 4, 5 denotes a leading one detector, 60 denotes a subtracter, 7*a* denotes a first MUX circuit, 7*c* denotes a second MUX circuit, 8 denotes a first AND gate, 9 denotes an OR gate, 10 denotes a shifter, 21 denotes a one-bit right shifter for shifting a binary word applied thereto one bit position to the right, 20 denotes a selecting signal generating unit, and 30 denotes a second AND gate.

In FIG. 25, reference character A denotes an input binary number, i.e., an input signal representing the exponent part of a floating point number to be processed by the normalization circuitry of this embodiment, B denotes another input binary number, i.e., another input signal representing the mantissa part of the floating point number to be processed by the normalization circuitry of this embodiment, and E denotes an output binary number, i.e., an output signal representing the exponent part of the floating point number processed by the normalization circuitry, e.g., normalized, unnormalized, or on which the zero function is performed. Furthermore, reference numeral D denotes a binary number, i.e., a control signal representing a shift amount for normalizing the input signal B representing the mantissa part of the floating point number to be processed, and F denotes another output binary number, i.e., another output signal representing the mantissa part of the floating point number processed by the normalization circuitry of this embodiment. In addition, each notation [n:m] shown aside each character showing each signal in FIG. 25 indicates that a corresponding binary number is comprised of (n−m+1) bits from bit m to bit n.

The normalization circuitry of the eighth embodiment shown in the figure is so constructed as to receive an 8-bit input signal A representing the exponent part of a floating point number to be processed and a 24 bit input signal B representing the mantissa part of the floating point number, furnish an 8-bit output signal E representing the exponent part of the floating point number processed by this circuitry and a 23-bit output signal F representing the mantissa part of the floating point number processed by this circuitry, and generate a 25-bit signal D representing a shift amount.

The decoder 4, leading one detector 5, subtracter 60, first and second MUX circuits 7*a* and 7*c*, and shifter 10 have the same structures as those of the normalization circuitry of the second embodiment mentioned above, respectively. The encoder 17 has the same structure as that of the normalization circuitry of the third embodiment mentioned above. Furthermore, the reference signal table circuit 19 which generates a reference signal A" from the output signal A' from the decoder 4 has the same structure as that of the normalization circuitry of the fifth embodiment mentioned above. Accordingly, the description about the operation of the normalization circuitry of the eighth embodiment will be omitted hereinafter.

The present invention can also be applied to floating point numbers with double precision which complies with IEEE standard P754. In the case of double precision which complies with IEEE standard P754, a floating point number is expressed as a 64-bit binary word comprised of a sign bit S, the exponent part E of eleven bits, and the mantissa part F of fifty-two bits. A floating point number having double precision which complies with IEEE standard P754 can be classified into either a normalized number or a unnormalized number. When the exponent part is greater than 0 and is less than 2048, the floating point number is called "normalized number". The mantissa part of a normalized number satisfies the following relation: 1≦the mantissa part<2. Furthermore, since the most significant bit (MSB) of the mantissa part is 1 without exception, only lower bits of the mantissa part located below the MSB can be shown in the representation of a normalized number. A normalized number is thus expressed in the following equation:

$$\text{Normalized number}=(-1)^s\times(1+F\times2^{E-52})\times2^{-1023}$$

On the other hand, a floating point number having its exponent part of 0 is called "unnormalized number". Such a unnormalized number is expressed in the following equation:

$$\text{Unnormalized number}=(-1)^s\times(F\times2^{-52})\times2^{-1022}$$

In order to process floating point numbers with double precision which comply with IEEE standard P754, the bit widths of signals processed and generated by the normalization circuitry need to be extended in the following manner. For example, the bit widths of the exponent input signal A and the exponent output signal E have to be 11 bits long. The bit width of the mantissa input signal B has to be 53 or more bits long, and the bit width of the mantissa output signal E has to be 52 bits long. Furthermore, the bit width of the control signal D representing a shift amount for shifting the mantissa input signal B has to be 54 or more bits long.

As previously mentioned, according to the present invention, there is provided normalization circuitry which can avoid the necessity of incorporating an additional circuit with the zero function thereinto. Furthermore, the normalization circuitry of the present invention can process a floating point number at a high speed even when the mantissa input signal B reaches the normalization circuitry after the arrival of the exponent input signal A. Accordingly, the normalization circuitry has the advantage of being suitable for implementing a high speed floating point computation device using an integrated circuit formed of MOS FETs.

Many widely different embodiments of the present invention may be constructed without departing from the spirit and scope of the present invention. It should be understood that the present invention is not limited to the specific embodiments described in the specification, except as defined in the appended claims.

What is claimed is:

1. Normalization circuitry comprising:

reference signal generating means for generating a reference signal one or more highmost bits of which are all set to 1 and the other bits of which are all set to 0, the number of the highmost bits being defined by the value of a first input signal representing the exponent part of a floating point number to be processed, when the value of the first input signal is greater than 0; otherwise, generating a reference signal all the bits of which are set to 0;

a first AND gate for computing the logical AND of the reference signal generated by said reference signal generating means with a second input signal representing the mantissa part of the floating point number to be processed bit by bit;

an OR gate for computing the logical OR of all the bits of the output of said first AND gate;

leading one detecting means for searching through all the bits of the second input signal from its most significant bit and then determining whether each bit of the second input signal is 1 or 0 to detect the bit position of the leading 1 of the second input signal, and then generate a signal only one bit at the detected bit position of which is set to 1 and to which one bit set to 0 is added as the most significant bit of the signal, or a signal only the most significant bit of which is set to 1 when all the bits of the second input signal except its least significant bit are 0;

means for delivering the most significant bit of the signal from said leading one detecting means as the most significant bit of a control signal representing a shift amount for shifting the second input signal;

one-bit shifting means for shifting all the bits of the signal except its most significant bit from said leading one detecting means one bit position to the right;

decoding means for decoding the first input signal into a signal having a bit width which is equal to that of the second input signal;

first selecting means for selecting and furnishing the output of said one-bit shifting means as all the bits of the control signal except its most significant bit when the output of said OR gate is at logic 1, and for selecting and furnishing the output of said decoding means as all the bits of the control signal except its most significant it when the output of said OR gate is at logic 0;

shifting means for shifting the second input signal by the shift amount represented by the control signal comprised of the most significant bit delivered by said delivering means and all the bits of the output furnished by said first selecting means so as to generate a signal having a binary value representing the mantissa part of the floating point number processed;

priority encoding means for searching through all the bits of the second input signal from its most significant bit and determining whether each bit of the second input signal is 1 or 0 so as to detect the bit position of the leading 1 of the second input signal and then subtract 1 from the number showing the bit position of the leading 1 counted from the most significant bit, and generate a signal having a binary value which corresponds to the subtraction result; and second selecting means for furnishing a subtraction result obtained by subtracting the value of the signal from said priority encoding means from the value of the first input signal as an output signal representing the exponent part of the floating point number processed when the output of said OR gate is at logic 1, and for furnishing a signal having a binary value of 0 as the output signal representing the exponent part of the floating point number processed when the output of said OR gate is at logic 0.

2. The normalization circuitry according to claim 1, wherein said second selecting means includes a subtracter for subtracting the value of the signal from said priority encoding means from the value of the first input signal, and a second AND gate having its first input terminal connected to an output terminal of said subtracter and its second input terminal connected to an output terminal of said OR gate.

3. The normalization circuitry according to claim 2, wherein said reference signal generating means generates a reference signal one or more highmost bits of which are all set to 1 and the other bits of which are all set to 0, the number of the highmost bits being defined by the value of the first input signal, or a reference signal all the bits of which are set to 0 directly from the first input signal.

4. The normalization circuitry according to claim 2, wherein said reference signal generating means generates a reference signal one or more highmost bits of which are all set to 1 and the other bits of which are all set to 0, the number of the highmost bits being defined by the value of the first input signal, or a reference signal all the bits of which are all set to 0 from the output signal from said decoding means.

5. The normalization circuitry according to claim 1, wherein said second selecting means includes a multiplexer circuit for furnishing the first input signal applied to a first input terminal thereof when the output of said OR gate is at logic 0, and for furnishing the output signal from said priority encoding means applied to a second input terminal thereof when the output of said OR gate is at logic 1, and a subtracter for subtracting the value of the signal from said multiplexer circuit from the value of the first input signal.

6. The normalization circuitry according to claim 5, wherein said reference signal generating means generates a reference signal one or more highmost bits of which are all set to 1 and the other bits of which are all set to 0, the number of the highmost bits being defined by the value of the first input signal, or a reference signal all the bits of which are set to 0 directly from the first input signal.

7. The normalization circuitry according to claim 5, wherein said reference signal generating means generates a reference signal one or more highmost bits of which are all set to 1 and the other bits of which are all set to 0, the number of the highmost bits being defined by the value of the first input signal, or a reference signal all the bits of which are all set to 0 from the output signal from said decoding means.

8. The normalization circuitry according to claim 1, wherein said shifting means generates a signal having a binary value representing the mantissa part of the processed floating point number having a bit width which is less than that of the second input signal.

9. The normalization circuitry according to claim 8, wherein said reference signal generating means generates a reference signal one or more highmost bits of which are all set to 1 and the other bits of which are all set to 0, the number of the highmost bits being defined by the value of the first input signal, or a reference signal all the bits of which are set to 0 directly from the first input signal.

10. The normalization circuitry according to claim 8, wherein said reference signal generating means generates a reference signal one or more highmost bits of which are all set to 1 and the other bits of which are all set to 0, the number of the highmost bits being defined by the value of the first input signal, or a reference signal all the bits of which are all set to 0 from the output signal from said decoding means.

11. Normalization circuitry comprising:

reference signal generating means for generating a reference signal one or more highmost bits of which are all set to 1 and the other bits of which are all set to 0, the number of the highmost bits being defined by the value of a first input signal representing the exponent part of a floating point number to be processed, when the value of the first input signal is greater than 0; otherwise, generating a reference signal all the bits of which are set to 0;

a first AND gate for computing the logical AND of the reference signal generated by said reference signal generating means with a second input signal representing the mantissa part of the floating point number to be processed bit by bit;

an OR gate for computing the logical OR of all the bits of the output of said first AND gate;

leading one detecting means for searching through all the bits of the second input signal from its most significant bit and then determining whether each bit of the second input signal is 1 or 0 to detect the bit position of the leading 1 of the second input signal, and then generate a signal only one bit at the detected bit position of which is set to 1 and to which one bit set to 0 is added as the most significant bit of the signal, or a signal only the most significant bit of which is set to 1 when all the bits of the second input signal except its least significant bit are 0;

means for delivering the most significant bit of the signal from said leading one detecting means as the most significant bit of a control signal representing a shift amount for shifting the second input signal;

one-bit shifting means for shifting all the bits of the signal except its most significant bit from said leading one detecting means one bit position to the right;

decoding means for decoding the first input signal into a signal having a bit width which is equal to that of the second input signal;

first selecting means for selecting and furnishing the output of said one-bit shifting means as all the bits of the control signal except its most significant bit when the output of said OR gate is at logic 1, and for selecting and furnishing the output of said decoding means as all the bits of the control signal except its most significant bit when the output of said OR gate is at logic 0;

shifting means for shifting the second input signal by the shift amount represented by the control signal comprised of the most significant bit delivered by said delivering means and all the bits of the output furnished by said first selecting means so as to generate a signal having a binary value representing the mantissa part of the floating point number processed;

a second AND gate for computing the logical AND of the least significant bit of the second input signal with the most significant bit of the signal from said leading one detecting means;

encoding means for determining whether each bit of a binary number comprised of all the bits of the signal except the most significant bit from said leading one detecting means and the output of said second AND gate as its least significant bit is 1 or 0 while searching through all the bits of the binary number from its most significant bit so as to detect the bit position of the leading 1 of the binary number and then subtract 1 from the number showing the bit position of the leading 1 counted from the most significant bit, and generate a signal having a binary value which corresponds to the subtraction result; and second selecting means for furnishing a subtraction result obtained by subtracting the value of the signal from said encoding means from the value of the first input signal as an output signal representing the exponent part of the floating point number processed when the output of said OR gate is at logic 1, and for furnishing a signal having a binary value of 0 as the output signal representing the exponent part of the floating point number processed when the output of said OR gate is at logic 0.

12. The normalization circuitry according to claim 11, wherein said second selecting means includes a subtracter for subtracting the value of the signal from said encoding means from the value of the first input signal, and a third AND gate having its first input terminal connected to an output terminal of said subtracter and its second input terminal connected to an output terminal of said OR gate.

13. The normalization circuitry according to claim 12, wherein said reference signal generating means generates a reference signal one or more highmost bits of which are all set to 1 and the other bits of which are all set to 0, the number of the highmost bits being defined by the value of the first input signal, or a reference signal all the bits of which are set to 0 directly from the first input signal.

14. The normalization circuitry according to claim 12, wherein said reference signal generating means generates a reference signal one or more highmost bits of which are all set to 1 and the other bits of which are all set to 0, the number of the highmost bits being defined by the value of the first input signal, or a reference signal all the bits of which are all set to 0 from the output signal from said decoding means.

15. The normalization circuitry according to claim 11, wherein said second selecting means includes a multiplexer circuit for furnishing the first input signal applied to a first input terminal thereof when the output of said OR gate is at logic 0, and for furnishing the output signal from said encoding means applied to a second input terminal thereof when the output of said OR gate is at logic 1, and a subtracter for subtracting the value of the signal from said multiplexer circuit from the value of the first input signal.

16. The normalization circuitry according to claim 15, wherein said reference signal generating means generates a reference signal one or more highmost bits of which are all set to 1 and the other bits of which are all set to 0, the number of the highmost bits being defined by the value of the first input signal, or a reference signal all the bits of which are set to 0 directly from the first input signal.

17. The normalization circuitry according to claim 15, wherein said reference signal generating means generates a reference signal one or more highmost bits of which are all set to 1 and the other bits of which are all set to 0, the number of the highmost bits being defined by the value of the first input signal, or a reference signal all the bits of which are all set to 0 from the output signal from said decoding means.

18. The normalization circuitry according to claim 11, wherein said shifting means generates a signal having a binary value representing the mantissa part of the processed floating point number having a bit width which is less than that of the second input signal.

19. The normalization circuitry according to claim 18, wherein said reference signal generating means generates a reference signal one or more highmost bits of which are all set to 1 and the other bits of which are all set to 0, the number of the highmost bits being defined by the value of the first input signal, or a reference signal all the bits of which are set to 0 directly from the first input signal.

20. The normalization circuitry according to claim 18, wherein said reference signal generating means generates a reference signal one or more highmost bits of which are all set to 1 and the other bits of which are all set to 0, the number of the highmost bits being defined by the value of the first input signal, or a reference signal all the bits of which are all set to 0 from the output signal from said decoding means.

* * * * *